US012574832B2

(12) United States Patent
Nayak et al.

(10) Patent No.: US 12,574,832 B2
(45) Date of Patent: Mar. 10, 2026

(54) METHOD AND SYSTEM FOR PROVIDING BACK-OFF TIMER TO UEs DURING NETWORK SLICE ADMISSION CONTROL

(71) Applicant: Samsung Electronics Co., Ltd., Suwon-si (KR)

(72) Inventors: Ashok Kumar Nayak, Bangalore (IN); Jungshin Park, Suwon-si (KR); Lalith Kumar, Bangalore (IN); Varini Gupta, Bangalore (IN); Danish Ehsan Hashmi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 558 days.

(21) Appl. No.: 17/812,846

(22) Filed: Jul. 15, 2022

(65) Prior Publication Data

US 2023/0016724 A1 Jan. 19, 2023

(30) Foreign Application Priority Data

Jul. 16, 2021 (IN) .............................. 202141032193
Jun. 20, 2022 (IN) .............................. 202141032193

(51) Int. Cl.
| | |
|---|---|
| *H04W 48/18* | (2009.01) |
| *H04W 48/06* | (2009.01) |
| *H04W 60/04* | (2009.01) |

(52) U.S. Cl.
CPC ........... *H04W 48/18* (2013.01); *H04W 48/06* (2013.01); *H04W 60/04* (2013.01)

(58) Field of Classification Search
CPC ...... H04W 48/18; H04W 48/06; H04W 60/04
See application file for complete search history.

(56) References Cited

U.S. PATENT DOCUMENTS

| | | |
|---|---|---|
| 2019/0246334 A1 | 8/2019 | Wang et al. |
| 2021/0051516 A1 | 2/2021 | Huang-Fu et al. |
| | (Continued) | |

FOREIGN PATENT DOCUMENTS

| | | |
|---|---|---|
| WO | 2018/192340 A1 | 10/2018 |
| WO | 2019030429 A1 | 2/2019 |
| | (Continued) | |

OTHER PUBLICATIONS

Examination report dated Mar. 2, 2023, in connection with Indian Patent Application No. 202141032193, 6 pages.
(Continued)

*Primary Examiner* — Jae Y Lee
*Assistant Examiner* — Nhu Pham

(57) ABSTRACT

The present disclosure relates to the field of network slicing in wireless communication. In accordance with an aspect of the disclosure, a method performed by an access and mobility function (AMF) entity is provided. The method includes receiving, from a user equipment (UE), a registration request including a requested network slice selection assistance information (NSSAI); transmitting, to a Network Slice Admission Control Function (NSACF) entity, a request for determination of an availability of a number of UEs based on the registration request; and in case that a rejection for the request is received from the NSACF, transmitting, to the UE, information on a back-off timer.

8 Claims, 16 Drawing Sheets

(56) References Cited

U.S. PATENT DOCUMENTS

| | | | | |
|---|---|---|---|---|
| 2023/0171639 A1* | 6/2023 | Kim | ..................... | H04W 48/18 |
| | | | | 370/229 |
| 2024/0031930 A1* | 1/2024 | Zhu | ..................... | H04W 60/00 |

FOREIGN PATENT DOCUMENTS

| | | | |
|---|---|---|---|
| WO | 2020117796 A1 | 6/2020 |
| WO | 2020/225684 A1 | 11/2020 |

OTHER PUBLICATIONS

"3rd Generation Partnership Project; Technical Specification Group Services and System Aspects; Procedures for the 5G System (5GS); Stage 2 (Release 17)", 3GPP TS 23.502 V17.1.0 (Jun. 2021), 692 pages.

"3rd Generation Partnership Project; Technical Specification Group Services and System Aspects; Architecture enhancements for 5G System (5GS) to support network data analytics services (Release 17)", 3GPP TS 23.288 V17.1.0 (Jun. 2021), 192 pages.

International Search Report dated Nov. 7, 2022 in connection with International Patent Application No. PCT/KR2022/010383, 4 pages.

Written Opinion of the International Searching Authority dated Nov. 7, 2022 in connection with International Patent Application No. PCT/KR2022/010383, 5 pages.

3GPP TS 23.501 V17.5.0 (Jun. 2022), Technical Specification, 3rd Generation Partnership Project; Technical Specification Group Services and System Aspects; System architecture for the 5G System (5GS); Stage 2 (Release 17), Jun. 2022, 568 pages.

3GPP TS 23.502 V17.5.0 (Jun. 2022), Technical Specification, 3rd Generation Partnership Project; Technical Specification Group Services and System Aspects; Procedures for the 5G System (5GS); Stage 2 (Release 17), Jun. 2022, 744 pages.

3GPP TS 24.501 V17.7.1 (Jun. 2022), Technical Specification, 3rd Generation Partnership Project; Technical Specification Group Core Network and Terminals; Non-Access-Stratum (NAS) protocol for 5G System (5GS); Stage 3; (Release 17), Jun. 2022, 991 pages.

* cited by examiner

1

METHOD AND SYSTEM FOR PROVIDING BACK-OFF TIMER TO UEs DURING NETWORK SLICE ADMISSION CONTROL

CROSS-REFERENCE TO RELATED APPLICATIONS

This application is based on and claims priority under 35 U.S.C. § 119 to Indian Patent Application No. 202141032193, filed Jul. 16, 2021 and Indian Patent Application No. 202141032193, filed Jun. 20, 2022, both in the Indian Intellectual Property Office, the disclosures of which are incorporated by reference herein in their entirety.

BACKGROUND

1. Field

The present disclosure relates to the field of network slicing in wireless communication. In particular, the present disclosure relates to a method and system for providing different back-off timer values to user equipment's (UEs) during Network Slice Admission Control (NSAC).

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

This summary is provided to introduce a selection of concepts in a simplified format that is further described in the detailed description of the disclosure. This summary is not intended to identify key or essential inventive concepts of the disclosure, nor is it intended for determining the scope of the disclosure.

In accordance with an aspect of the disclosure, a method performed by an access and mobility function (AMF) entity is provided. The method includes receiving, from a user equipment (UE), a registration request including a requested network slice selection assistance information (NSSAI); transmitting, to a Network Slice Admission Control Function (NSACF) entity, a request for determination of an availability of a number of UEs based on the registration request; and in case that a rejection for the request is received from the NSACF, transmitting, to the UE, information on a back-off timer.

In accordance with another aspect of the disclosure, a method performed by a session management function (SMF) entity is provided. The method includes receiving, from a user equipment (UE), a registration request including a protocol data unit (PDU) session establishment request including a single NSSAI (S-NSSAI); transmitting, to a Network Slice Admission Control Function (NSACF) entity, a request for an availability of a number of protocol data unit (PDU)s per a network slice based on the registration request based on the received registration request; and in case that a rejection for the request is received from the NSACF, transmitting, to the UE, information on a back-off timer.

In accordance with another aspect of the disclosure, a method performed by a network data analytics function (NWDAF) entity is provided. The method includes receiving, from an access and mobility function (AMF) entity or a session management function (SMF) entity, a request for analytics related to a network slice admission control (NSAC) of the AMF entity or the SMF entity; collecting information related to the NSAC of the AMF entity or the SMF entity based on the received request for a time duration; generating the analytics related to the NSAC of the AMF entity or the SMF entity based on the collected information; and transmitting, to the AMF entity or the SMF entity, the analytics related to the NSAC of the AMF entity or the SMF entity.

In accordance with another aspect of the disclosure, an access and mobility function (AMF) entity is disclosed. The AMF entity includes a transceiver; and a processor coupled to the transceiver, the processor configured to: receive, from a user equipment (UE), a registration request including a requested network slice selection assistance information (NSSAI); transmit, to a Network Slice Admission Control Function (NSACF) entity, a request for determination of an availability of a number of UEs based on the registration request; and in case that a rejection for the request is received from the NSACF, transmit, to the UE, information on a back-off timer.

In accordance with another aspect of the disclosure, a session management function (SMF) entity is provided. The SMF entity includes a transceiver; and a processor coupled to the transceiver, the processor configured to: receive, from a user equipment (UE), a registration request including a protocol data unit (PDU) session establishment request including a single NSSAI (S-NSSAI); transmit, to a Network Slice Admission Control Function (NSACF) entity, a request for an availability of a number of protocol data unit (PDU)s per a network slice based on the registration request based on the received registration request; and in case that a rejection for the request is received from the NSACF, transmit, to the UE, information on a back-off timer.

In accordance with another aspect of the disclosure, a network data analytics function (NWDAF) entity is provided. The NWDAF entity includes a transceiver; and a processor coupled to the transceiver, the processor configured to: receive, from an access and mobility function (AMF) entity or a session management function (SMF) entity, a request for analytics related to a network slice admission control (NSAC) of the AMF entity or the SMF entity; collect information related to the NSAC of the AMF entity or the SMF entity based on the received request for a time duration; generate the analytics related to the NSAC of the AMF entity or the SMF entity based on the collected information; and transmit, to the AMF entity or the SMF entity, the analytics related to the NSAC of the AMF entity or the SMF entity.

In accordance with another aspect of the disclosure a method for providing a back-off timer to one or more UEs is provided. The method includes receiving, by a first Network Function (NF) node from the one or more UEs, one of a registration request to use a network slice of the first NF node, a protocol data unit (PDU) session establishment request with a single network slice selection assistance information (S-NSSAI), or a packet data network (PDN) connection request. The method further includes triggering, by the first NF node based on one of the received registration request, the PDU session establishment request, or the PDN connection request, a request for determination of an availability of a number of UEs or PDUs per network slice to a second NF node. The method further includes subscribing, by the first NF node to a third NF node, a request for analytics related to a network slice admission control (NSAC) of the first NF node. Once the request for the analytics is subscribed, the method further includes receiving, by the first NF node, a result of the determination of the availability of the number of UEs or PDUs per network slice from the second NF node and results of the analytics related to the NSAC from the third NF node. After the reception of the result of the determination from the second NF node, the method further includes providing, by the first NF node based on a result of the determination, a different range of time values of a back-off timer to the one or more UEs using the received results of the analytics.

In accordance with another aspect of the disclosure, a system for providing a back-off timer to one or more UEs is provided. The system includes a plurality of network nodes including a first Network Function (NF) node, a second NF node, and a third NF node. The first NF node is configured to receive one of a registration request to use a network slice of the first NF node, a PDU session establishment request with an S-NSSAI or a PDN connection request. The first NF node is further configured to trigger, based on one of the received registration request, the PDU session establishment request, or the PDN connection request, a request for determination of an availability of a number of UEs or PDUs per network slice to the second NF node. The second NF node is configured to determine whether there is availability of the number of UEs or PDUs per network slice based on a threshold corresponding to a maximum number of UEs that can register simultaneously with the network slice or to a maximum number of concurrent PDUs that can establish with the network. The first NF node is further configured to subscribe, to a third NF node, a request for analytics related to a network slice admission control (NSAC) of the first NF node and receive a result of the determination from the second NF node and results of the analytics related to the NSAC from the third NF node. Thereafter, the first NF node is further configured to provide, based on a result of the determination, a different range of time values of a back-off timer to the one or more UEs using the received results of the analytics.

In accordance with another aspect of the disclosure, a system for providing a back-off timer to one or more UEs is provided. The system includes a plurality of network nodes including an AF node, a first NF node, a second NF node, and a third NF node. The AF node is configured to subscribe a request to the first NF node for analytics related to an NSAC and receive results of the analytics from the first NF node in response to the subscribed request. The AF node is further configured to determine a different range of the back-off timer for the one or more UEs using the received results of the analytics and update configuration of a network slice quota along with the determined different range of the back-off timer. After updating the configuration of the network slice quota, the AF node is further configured to transmit the updated configuration to the second NF node. Thereafter, the second NF node is configured to provide the determined different range of the back-off timer to the third NF node while rejecting one of a registration request of the one or more UEs to use a network slice, a PDU session establishment request, or a PDN connection request.

To further clarify the advantages and features of the present disclosure, a more particular description of the disclosure will be rendered by reference to specific embodiments thereof, which is illustrated in the appended drawing. It is appreciated that these drawings depict only typical embodiments of the disclosure and are therefore not to be considered limiting its scope. The disclosure will be described and explained with additional specificity and detail with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
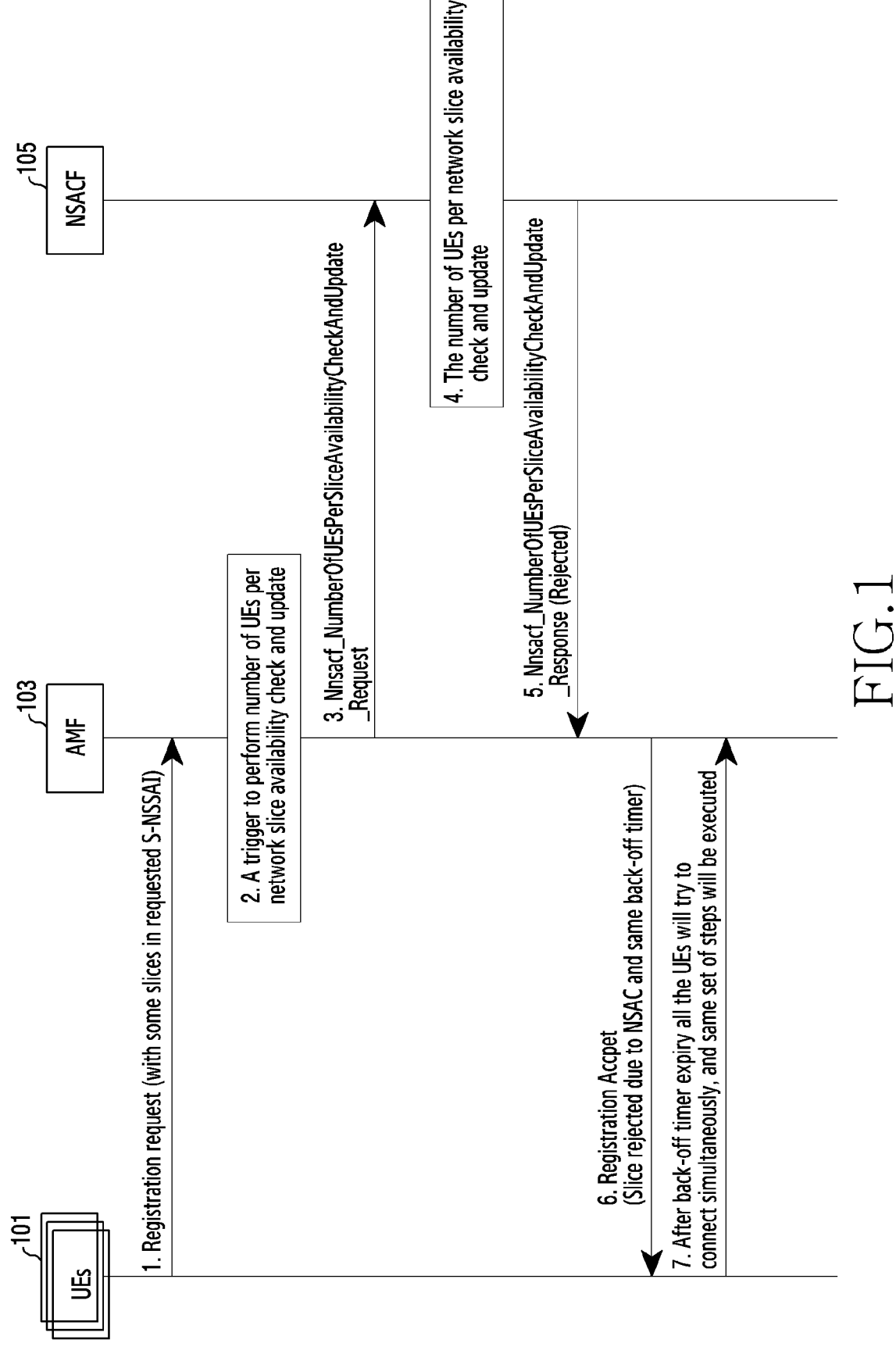
FIG. 1 illustrates a line diagram depicting a method illustrating a first problem of a signaling storm after the expiry of the back-off timer during UE registration, in accordance with the existing state of the art.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It should be understood at the outset that although illustrative implementations of the embodiments of the present disclosure are illustrated below, the present disclosure may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

In describing the embodiments of the disclosure, descriptions of technical contents that are well known in the technical field to which the disclosure belongs and are not directly related to the disclosure will be omitted. This is to more clearly convey the subject matter of the disclosure without obscuration thereof by omitting unnecessary descriptions thereof.

For the same reason, some components in the accompanying drawings may be exaggerated, omitted, or schematically illustrated. Also, the size of each component may not completely reflect the actual size thereof. In the drawings, the same or corresponding elements may be given the same reference numerals.

The advantages and features of the disclosure and the accomplishing methods thereof will become apparent from the embodiments of the disclosure described below in detail with reference to the accompanying drawings. The disclosure may, however, be embodied in many different forms and should not be construed as being limited to the embodiments of the disclosure described below; rather, these embodiments of the disclosure are provided to complete the disclosure and fully convey the scope of the disclosure to those of ordinary skill in the art and the disclosure will be defined only by the scope of the claims. Throughout the specification, like reference numerals may denote like elements.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "some" as used herein is defined as "one, or more than one, or all." Accordingly, the terms "one," "more than one," "more than one, but not all" or "all" would all fall under the definition of "some." The term "some embodiments" may refer to one embodiment or to several embodiments or to all embodiments. Accordingly, the term "some embodiments" is defined as meaning "one embodiment, or more than one embodiment, or all embodiments."

The terminology and structure employed herein are for describing, teaching, and illuminating some embodiments and their specific features and elements and do not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and must NOT be taken to exclude the possible removal of one or more of the listed features and elements, unless otherwise stated with the limiting language "must comprise" or "needs to include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element does not preclude there being none of that feature or element unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having ordinary skill in the art.

FIGS. 3 through 14, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Herein, terms to identify access nodes, terms to refer to network entities or NFs, terms to refer to messages, terms to refer to interfaces between network entities, etc., are examples for convenience of explanation. Accordingly, the disclosure is not limited to the terms as herein used and may use different terms to refer to the items having the same meaning in a technological sense.

Examples of a terminal may include a UE, a mobile station (MS), a cellular phone, a smartphone, a computer, a multimedia system capable of performing a communication function, or the like.

In the disclosure, a controller may also be referred to as a processor.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-usable or computer-readable memory that may be directed to a computer or other programmable data processing equipment to implement a function in a particular manner, the instructions stored in the computer-usable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

Also, the term "unit" used herein means a software component or a hardware component such as a field-programmable gate array (FPGA) or an application-specific integrated circuit (ASIC), and the "unit" performs some functions. However, the "~ unit" is not limited to software or hardware. The "~ unit" may be configured to be in an addressable storage medium or may be configured to operate one or more processors. Thus, as an example, the "~ unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~ units" may be associated with the smaller number of components and "~ units" or may be further divided into additional components and "~ units." In addition, the components and "~ units" may be implemented to operate one or more central processing units (CPUs) in a device or a security multimedia card. Also, in embodiments, the "~ unit" may include one or more processors.

In the following description, terms for identifying access nodes, terms referring to network entities, terms referring to messages, terms referring to interfaces between network entities, terms referring to various identification information, and the like are used for convenience of description. Thus, the disclosure is not limited to the terms used below and other terms referring to objects having equivalent technical meanings may be used.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

That is, in particularly describing the embodiments of the disclosure, the communication standards defined in 3GPP may be mainly targeted; however, the subject matter of the disclosure may also be applied to other communication systems having similar technical backgrounds with some modifications without materially departing from the scope of the disclosure, which may be possible by the judgment of those of ordinary skill in the technical field of the disclosure.

For the convenience of explanation, the disclosure will hereinafter use terms and definitions defined by the third generation partnership project (3GPP) long-term evolution (LTE), and 5th generation (5G) standards. The disclosure is not, however, limited to the terms and definitions, and may equally apply to any systems that conform to other standards.

3GPP Release 15 introduced the concept of "Network Slicing" which allows telecom service providers to deploy an exclusive network for a customer (e.g., Mobile Virtual Network Operator (MVNO), Enterprise) or service (e.g., Enhanced Mobile Broadband (eMBB), Ultra-Reliable Low Latency Communication (URLLC), Massive Machine Type Communication (mMTC)) consisting of multiple network functions designed specifically to support the specialized service. A set of such Network Functions is called "Network Slice", identified using S-NSSAI (Single Network Slice Selection Assistance Information) inside a 3GPP network.

These slices are characterized by a set of both standard and proprietary attributes as defined by a "slice template". GSMA defines a "Generic Network Slice Template" (GST) which provides standardized slice attributes for a set of services supported by 3GPP. Two of the attributes defined by GST are "Number of Terminals" and "Number of Sessions". Attribute "Number of Terminals" describes the maximum number of terminals UEs that can use the network slice simultaneously. Similarly, the attribute "Number of Sessions" describes the maximum number of Protocol Data Unit (PDU) sessions that can use the network slice simultaneously. These are important inputs in network planning, as operators need to make sure that the resources, they provide for the network slice are sufficient to handle the capacity specified by these attributes.

To enforce these attributes, 3GPP Rel-17 defines a functional entity "Network Slice Admission Control Function (NSACF)" which monitors and controls the number of UEs/Sessions registered to a network slice. The NSACF may be configured with the maximum number of UEs per network slice and is expected to be consulted by Access Management Function (AMF), while admitting a UE to the network. Similarly, the NSACF is configured with the maximum number of sessions per network slice and is expected to be consulted by Session Management Function (SMF), while activating a PDU Session. This is done for all network slices which are subject to the "quota" defined by these attributes. In 3gpp terminology, "Number of Terminals" may refer to "Number of UEs" or "Number of Registrations" per access-type. Similarly, "Number of Sessions" may refer to "Number of PDU Sessions". The terms are used interchangeably throughout this document.

As specified in 3GPP TS 23.501 (Rel-17), the NSACF controls i.e., increases or decreases the current number of UEs registered for a network slice so that it does not exceed the maximum number of UEs allowed to register with that network slice. The NSACF also maintains a list of UE IDs registered with a network slice that is subject to admission control. When the current number of UEs registered with a network slice is to be increased, the NSACF first checks whether the UE Identity is already in the list of UEs registered with that network slice and if not, it checks whether the maximum number of UEs per network slice for that network slice has already been reached.

The AMF triggers a request to the NSACF for maximum number of UEs per network slice admission control when the UE's registration status for a network slice subject to NSAC may change, i.e., during the UE Registration procedure, UE Deregistration procedure, or during Network Slice-Specific Authentication and Authorization procedures. Also, SMF+PGW-C trigger operation with the NSACF for maximum number of UEs during EPC IWK scenario.

3GPP TS 23.501 (Rel-17) also specifies that the NSACF also controls i.e., increase or decrease the current number of PDU Sessions per network slice so that it does not exceed the maximum number of PDU session allowed to be served by that network slice. When the current number of PDU sessions with the network slice is to be increased, the NSACF first checks whether the maximum number of PDU sessions per network slice for that network slice has already been reached.

The SMF triggers a request to the NSACF for a maximum number of PDU sessions per network slice control during PDU session establishment/release procedures. Also, SMF+PGW-C trigger operation with the NSACF for maximum during EPC IWK scenario.

During the NSAC procedure, when these 5G NFs like the AMF and the SMF check with the NSACF regarding the availability count, it may happen that the threshold might have been exceeded at the NSACF for that slice. 3GPP concluded that during the rejection, these NFs will provide the reject cause and optionally a back-off timer per each slice. After the expiry of this back-off timer, UE can try again the procedure with the network. But 3GPP has not defined the procedure to derive these back-off timers. Hence it may happen that all the UEs will be getting the same implementation-specific/configured timer by these NFs. This will lead to a signaling storm as almost all the UEs simultaneously will be trying/connecting with the network along with the expected traffic from new UEs which sends traffic to the network. Also, in one service area where the NSACF is deployed with the threshold being exceeded for one particular slice if a greater number of UEs are present in that service area will lead to a greater number of signaling messages to the network than in the case where fewer no UEs are present in that service area.

Figure 2:
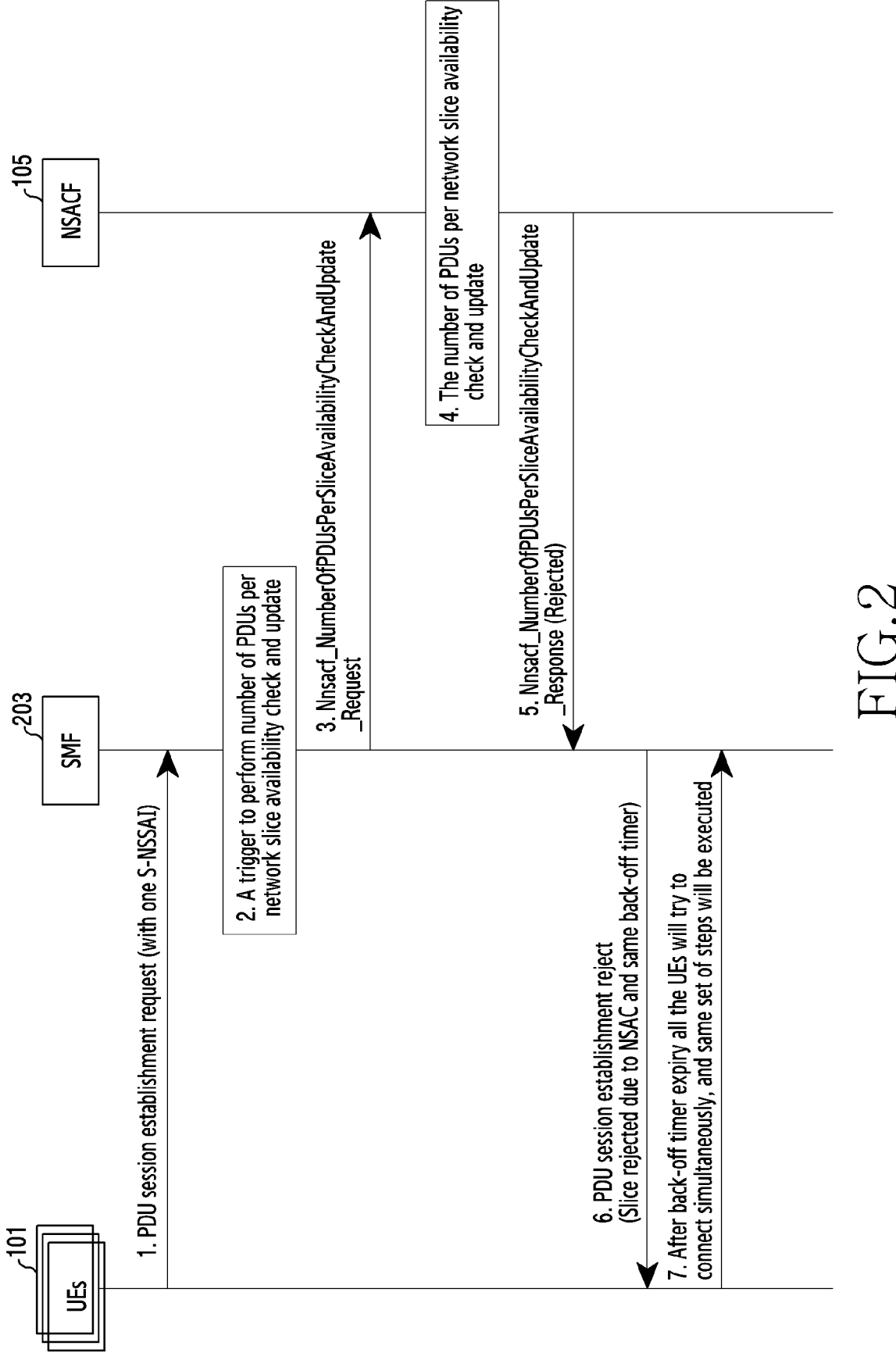
FIG. 2 illustrates a line diagram depicting a method illustrating a second problem of a signaling storm after the expiry of the back-off timer during PDU establishment, in accordance with an existing art.

An example scenario depicting the above-mentioned problems is also shown in FIG. 1 and FIG. 2, in accordance with the existing state of the art. FIG. 1 illustrates a line diagram depicting a method 100 illustrating a problem of a signaling storm after the expiry of the back-off timer during UE registration, in accordance with the existing state of the art. The method 100 depicts a sequence of events that are expected to take place in a typical network deployment when the 3GPP Rel17 NSAC (network slice admission control) feature for UE registration is deployed. For clarity call flow is mentioned between the AMF & the NSACF for one UE only, this procedure will be repeated for all the UEs. As per the existing standard TS 23.502 Sec 4.2.11.2, at step 1 of the method 100, the UEs 101 sends a registration request (with some slices in requested S-NSSAI) to the AMF 103. Thereafter, at step 2 of the method 100, the AMF 103 initiates a trigger operation to perform a number of UEs per network slice availability check and update. At step 3 of the method 100, the AMF 103 sends a status signal to the NSACF 105 for a number of UEs Slice availability and update request. Further, at step 4 of the method 100, the NSACF 105 determines the number of UEs per network slice availability check and update. At step 5 of the method 100, the NSACF 105 rejects the request received from the AMF 103 with a reject cause set to 'maximum number of UEs per network slice reached' as per the existing procedure mentioned in the 3GPP specification. When the AMF 103 receives the response from the NSACF 105, at step 6 of the method 100, the AMF 103 accepts the registration request received from the UEs 101 by mentioning the reason for slice rejection due to the NSAC and providing the same back-off timer to the UEs 101. At step 7 of the method 100, the UEs 101 will try to connect simultaneously with the AMF 103 for the network slice after the expiry of the back-off timer provided to the UEs 101 which leads to a signaling storm in the network, and the same set of steps 2 to 6 will be executed. During this time period when there are no quotas available at the NSACF 105, all the registration requests from the UEs 101 will be rejected with the same implementation specific/configured back-off timer. After the expiry of this back-off timer, all the UEs 101 will try again to connect simultaneously with the NFs (for example, AMF 103) which will again create a signaling storm.

Similarly, FIG. 2 illustrates a line diagram depicting a method 200 illustrating a problem of a signaling storm after the expiry of the back-off timer during PDU establishment, in accordance with the existing state of the art. The method 200 depicts a sequence of events that are expected to take place in a typical network deployment when the 3GPP Rel17 NSAC (network slice admission control) feature for the PDU session is deployed. As per the existing standard TS 23.502 Sec 4.2.11.4, at step 1 of the method 200, the UEs 101 send a PDU session establishment request (with one S-NSSAI) to the SMF 203. Thereafter, at step 2 of the method 200, the SMF 103 initiates a trigger operation to perform a number of PDUs per network slice availability check and update. At step 3 of the method 200, the SMF 103 sends a status signal to the NSACF 105 for the number of PDUs per Slice availability and update request. Further, in step 4 of the method 200, the NSACF 105 determines the number of PDUs per network slice availability check and update. At step 5 of the method 200, the NSACF 105 rejects the request received from the SMF 203 with a reject cause set to 'maximum number of PDUs per network slice reached' as per the existing procedure mentioned 3GPP specification. When the SMF 203 receives the response from the NSACF 105, at step 6 of the method 200, the SMF 103 rejects the PDU session establishment request received from the UEs 101 by mentioning the reason for slice rejection due to the NSAC and providing the back-off timer to the UEs 101. At step 7 of the method 200, the UEs 101 will try to connect simultaneously with the SMF 203 for the network slice after the expiry of the back-off timer provided to the UEs 101 which leads to a signaling storm in the network, and the same set of steps 2 to 6 will be executed. During this time period when there are no counts available at the NSACF 105, all the PDU session establishment requests from the UEs 101 will be rejected with the same implementation specific/configured back-off timer. After the expiry of this back-off timer, all the UEs 101 will try again to connect simultaneously with the NFs (for example, SMF 203) which will again create a signaling storm.

3GPP has defined only a maximum of one NSACF to be deployed per service area for a particular network slice. So, if a greater number of UEs are being present in that service area and a threshold has been exceeded then the network will experience more no of signaling messages than in the scenario where a smaller number of UEs are present in that service area.

Therefore, there is a need for a method and system for providing different back-off timer values to UEs while rejecting the UE registration or PDU session establishment request on that slice during the network slicing admission control (NSAC) procedure.

In the following description, objects that exchange information for access control and status management will be called by the names of NFs (e.g., access and mobility function (AMF), session management function (SMF), SMF+Packet Data Network Gateway-Control (PGW-C), Network Slice Admission Control Function (NSACF), etc.) for convenience of explanation.

Embodiments of the present disclosure will be described below in detail with reference to the accompanying drawings.

Figure 3:
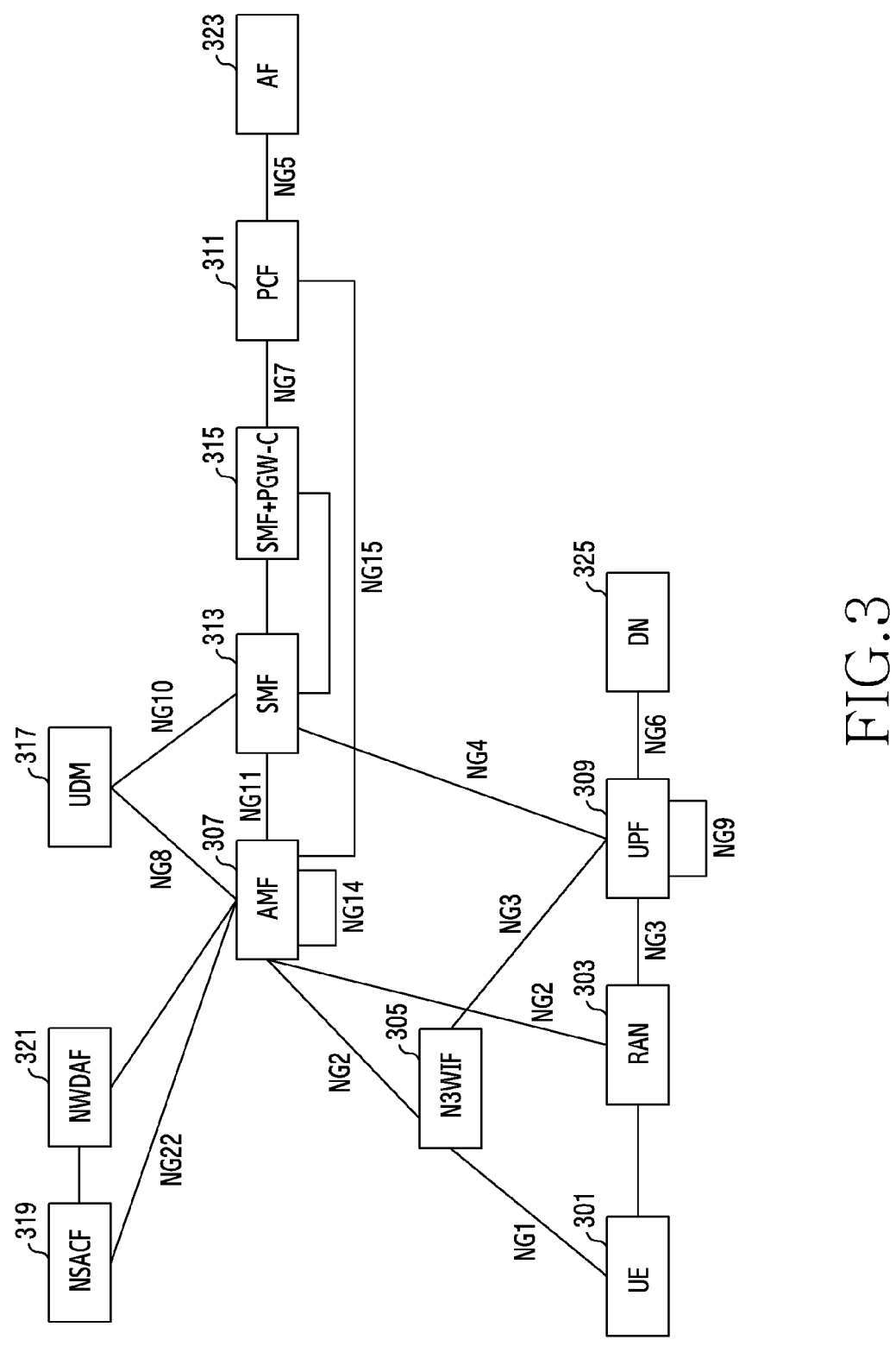
FIG. 3 illustrates a block diagram of a 5G communication system, in accordance with an embodiment of the present disclosure.

FIG. 3 illustrates a block diagram of a 5G communication system, in accordance with an embodiment of the present disclosure. The 5G communication system as shown in FIG. 3 is configured to perform the method steps illustrated in FIGS. 4 through 8.

As shown in FIG. 3, the 5G communication system includes a UE 301, a radio access network (RAN) 303, a non-3GPP (or N3GPP) access network, an AMF 307, a user plane function (UPF) 309, a policy control function (PCF) 311, an SMF 313, an SMF+PGW-C 315, a user data management function (UDM) 317, an NSACF 319, a network data analytics function (NWDAF) 321, an Application Function (AF) 323, a data network (DN) 325, etc.

The UE 301 may access the 5G components of 5G through the 3GPP radio access network (RAN) 303 or the non-3GPP access network 305. The UE 301 may be connected through the RAN 303 to the AMF 307 with an NG2 interface and to the UPF 309 with an NG3 interface. The RAN 303 may also be referred to as a base station (BS) such as gNB, an access point (AP), an eNodeB (eNB), a 5G node, and a gNodeB (gNB), or any other terms having equal technical meaning. The SMF 313 is connected to the UPF 309 via the NG4 interface. The PCF 311 is connected to the AF 323 via the NG5 interface. the UPF 309 is connected to the DN 325 via the NG6 interface. The SMF 313 is connected to the PCF 311 via the NG7 interface. The UDM 317 is connected to the AMF 307 via the NG8 interface. The UDM 317 is connected to the SMF 313 via the NG10 interface. The AMF 307 is connected to the SMF 313 via the NG11 interface.

A non-3GPP access network is an NF that serves as termination of the NG2 interface and the NG3 interface for the UE 301 connected via an access network not defined by 3GPP (non-3GPP access network), e.g., wireless fidelity (Wi-Fi). For example, for the non-3GPP access network 305, a non-3GPP interworking function (N3IWF), a trusted N3GPP gateway function (TNGF), and a wireline access gateway function (W-AGF), etc., may be used. In the present disclosure, as an example, the UE 301 is connected to the N3IWF 305 through a non-3PP access network which may be connected to the AMF 307 with the NG2 interface and to the UPF 303 with the NG3 interface.

The AMF 307 is an NF that manages access to a wireless network and mobility for a UE. The AMF 307 is also responsible for termination of RAN Control Plane interface (NG2) and NAS (NG1). The SMF 313 is an NF that manages a session for a UE, UE IP address allocation & management (including optional Authorization), selection and control of User Plane function, and termination of interfaces towards Policy control and Charging functions. The session information may include quality of service (QoS) information, charging information, and information about packet processing. The UPF 309 is an NF that handles user plane traffic under the control of the SMF 313. The PCF 311 is an NF that manages an operator policy to provide services in the wireless communication system. The PCF 311 provides policy rules to control plane function(s) that enforce them. The UDM 317 is an NF that stores and manages UE subscription data and stores subscription related information. A unified data repository (UDR) is an NF that stores and manages data. The UDR may store the UE subscription data and provide the UE subscription data to the UDM 317. The UDR may further store the operator policy information and provide the operator policy information to the PCF 311.

The NWDAF 321 is an NF that provides NSAC analytics information for the operation of the 5G communication system. The NWDAF 321 may periodically collect information from the other NFs included in the 5G communication system, analyze the collected information to derive the NSAC analytics, and provide the results of the analytics to the other NFs.

In an embodiment of the disclosure, a single network slice in the 5G communication system defined by the 3GPP may be referred to as single network slice selection assistance information (S-NSSAI). NSSAI may include one or more pieces of S-NSSAI. For example, the NSSAI may include, but not exclusively, Configured NSSAI stored in the UE 301, Requested NSSAI requested by the UE 301, Allowed NSSAI allowed to be used by a UE determined by an NF (e.g., AMF, SMF, SMF+PGW-C, NSACF, or the like) in the 5G communication system, UE subscribed NSSAI, etc.

The UE 301 may be connected both to the 3GPP access network and the non-3GPP access network to register with the 5G communication system. Specifically, the UE 301 may access the 3GPP RAN 303 to perform a registration procedure with the AMF 307. During the registration procedure, the AMF 307 may determine an allowed slice (Allowed NSSAI) available to the UE 301 that has access to the RAN 303 and allocate the slice to the UE 301. The UE 301 may access the N3IWF 305 to perform a registration procedure with the AMF 307. During the registration procedure, the AMF 307 may determine an allowed slice (Allowed NSSAI) available to the UE 301 that has access to the N3IWF 305 and allocate the slice to the UE 301. Each of the allowed slices may include the same S-NSSAI or a different S-NSSAI.

According to some embodiments of the present disclosure with reference to FIGS. 4 to 7, the AMF 307 corresponds to a first Network Function (NF) node in a case when the registration request from the UE 301 to use the network slice is received by the AMF 307. Further, the SMF 313 corresponds to the first NF node in a case when the PDU session establishment request with the S-NSSAI is received by the SMF 313 from the UE 301. Further, a combination of the SMF 313 and a PDN gateway (PGW-C) i.e., SMF+PGW-C 315 corresponds to the first NF node in a case when the PDN connection request is received by the SMF+PGW-C 315 from the UE 301.

Further, according to some embodiments of the present disclosure with reference to FIGS. 4 to 7, the NSACF 319 corresponds to a second NF node and the NWDAF 321 corresponds to a third NF node without deviating from the scope of the present disclosure.

Figure 4:
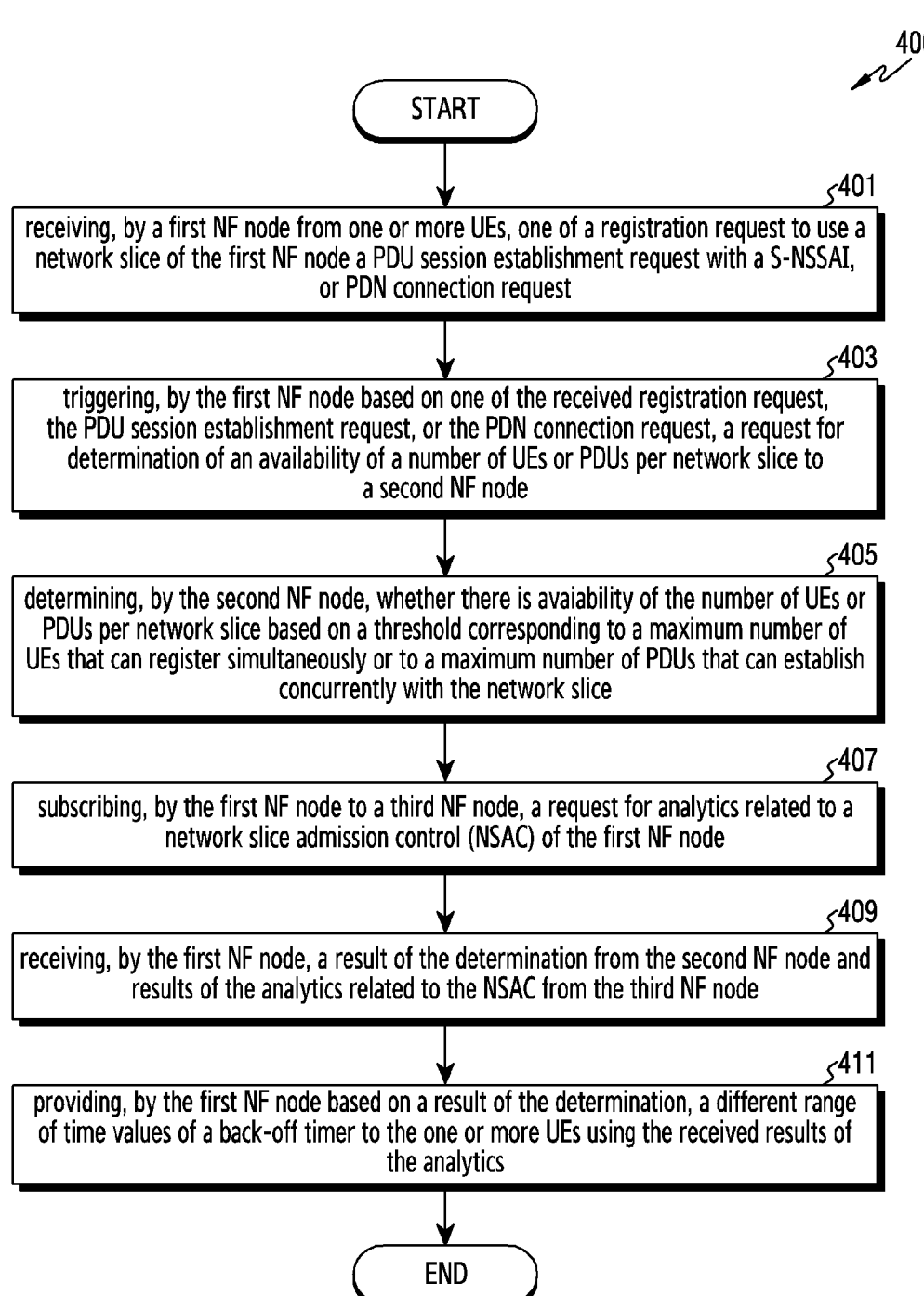
FIG. 4 illustrates a flow chart of method steps for providing different back-off timers to UEs, in accordance with an embodiment of the present disclosure.
Figure 5:
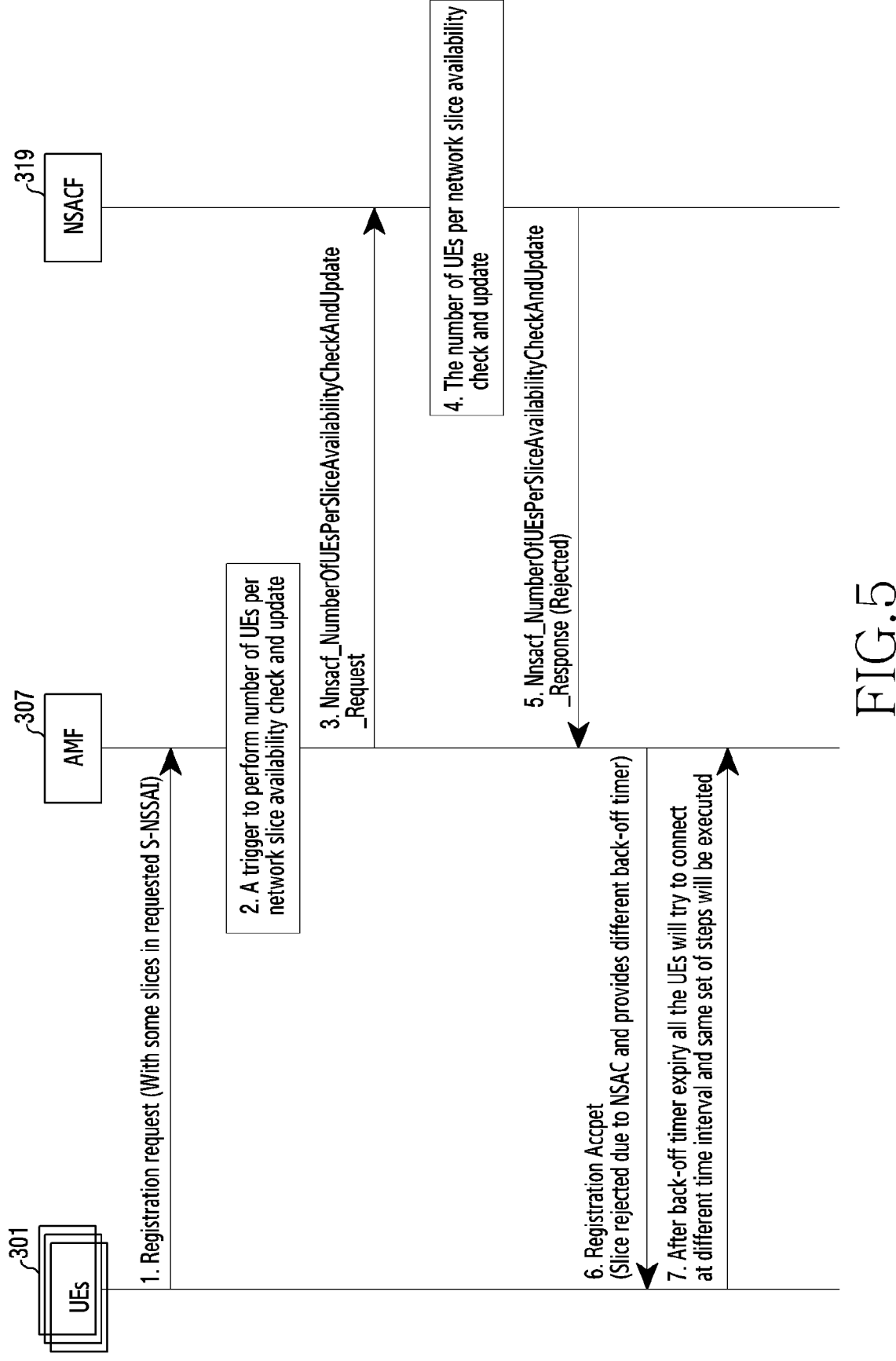
FIG. 5 illustrates a line diagram illustrating a scenario where AMF 307 provides different back-off timers to all the UEs with the help of NSAC analytics received from NWDAF 321, in accordance with an embodiment of the present disclosure.
Figure 6:
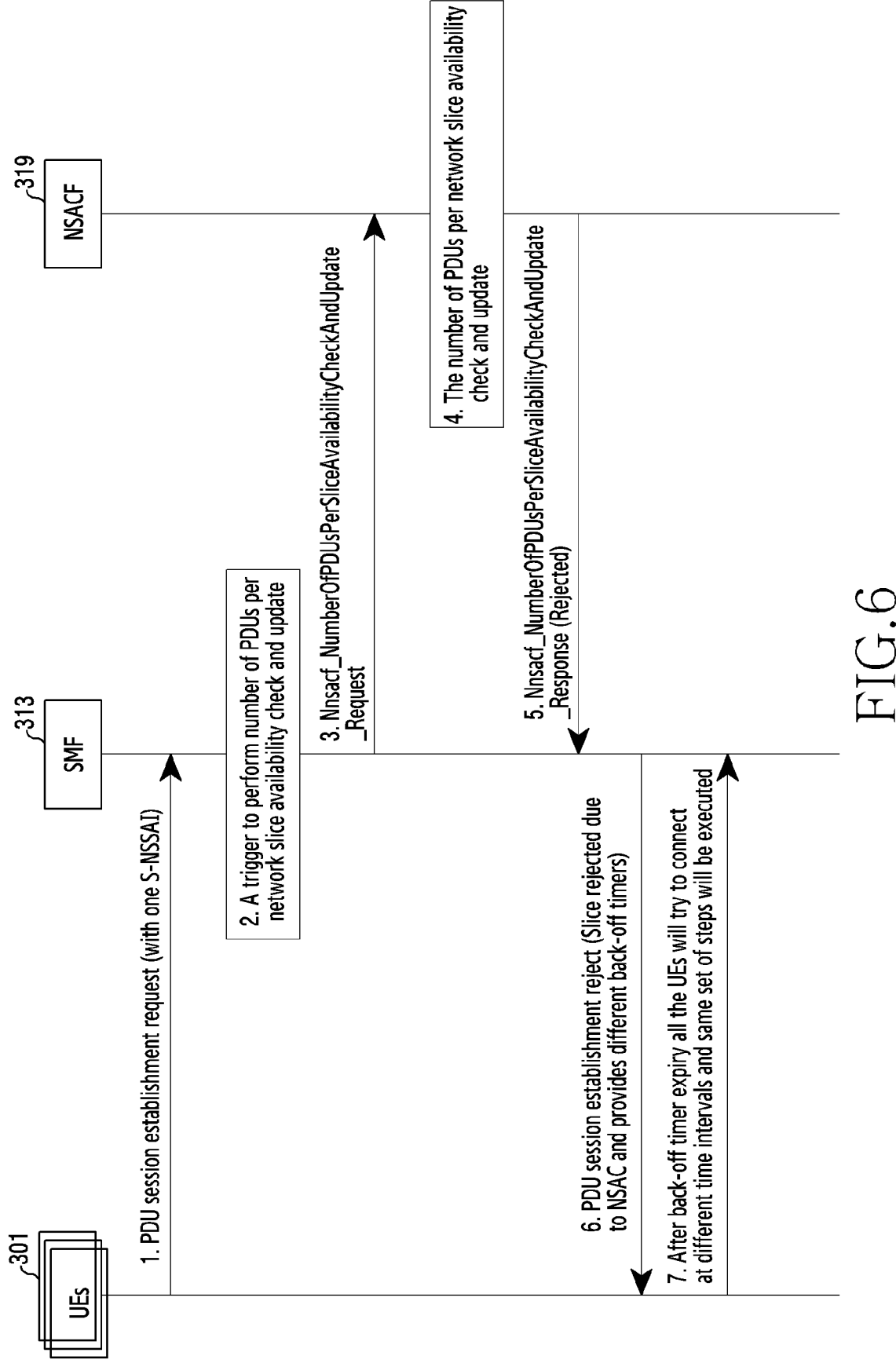
FIG. 6 illustrates a line diagram illustrating a scenario where SMF 313 provides different back-off timers to all the UEs with the help of NSAC analytics received from NWDAF 321, in accordance with an embodiment of the present disclosure.
Figure 7:
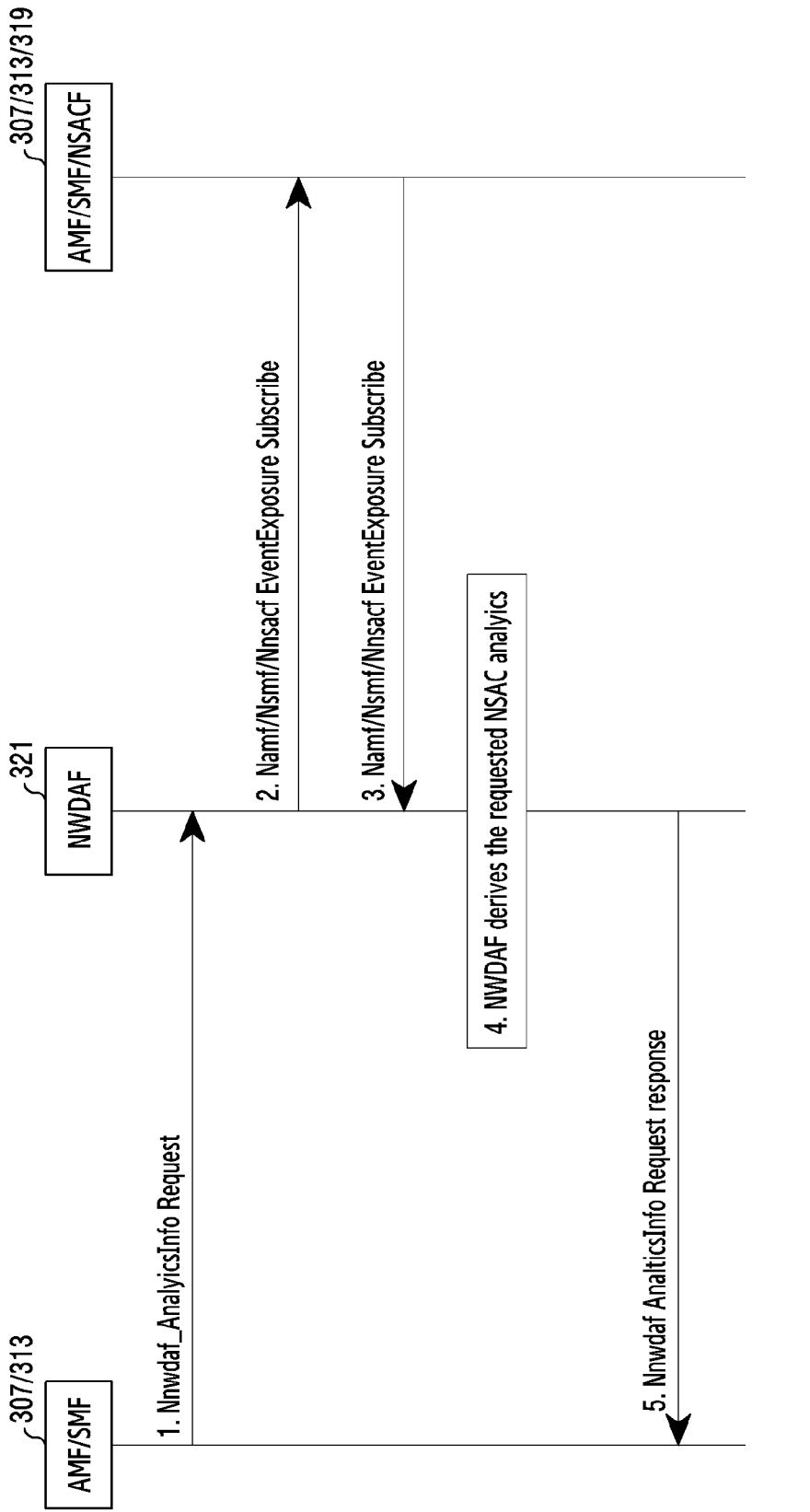
FIG. 7 illustrates a line diagram illustrating method steps depicting how AMF 307/SMF 313 gets NSAC analytics from NWDAF 321, in accordance with an embodiment of the present disclosure.

FIG. 4 illustrates a flow chart of method steps for providing different back-off timers to UEs, in accordance with an embodiment of the present disclosure. FIG. 5 illustrates a line diagram illustrating a scenario where the AMF 307 provides different back-off timers to all the UEs with the help of NSAC analytics received from NWDAF 321, in accordance with an embodiment of the present disclosure. FIG. 6 illustrates a line diagram illustrating a scenario where the SMF 313 provides different back-off timers to all the UEs with the help of NSAC analytics received from the NWDAF 321, in accordance with an embodiment of the present disclosure. FIG. 7 illustrates a line diagram illustrating methods steps depicting how AMF 307/SMF 313 gets NSAC analytics from the NWDAF 321, in accordance with an embodiment of the present disclosure.

The method 400 comprises (at step 401), receiving one of a registration request to use a network slice of the first NF node, a PDU session establishment request with an S-NSSAI, or a PDN connection request from one or more UEs. As an example, the first NF node (one of AMF 307, SMF 313, or SMF+PGW-C 315) receives one of the registration request to use a network slice of the AMF 307, the PDU session establishment request, or the PDN connection request from the UE 301. Also, as an example in step 1 FIG. 5, the UEs 301 sends a registration request (with some slices in the requested S-NSSAI) to the AMF 307. Similarly, as an example, in step 1 FIG. 6, the UEs 301 sends a PDU session establishment request (with one S-NSSAI) to the SMF 313. The flow of the method 400 now proceeds to (step 403).

At step 403, the method 400 further comprises triggering, based on one of the received registration request, the PDU session establishment request, or the PDN connection request, a request for determination of an availability of a number of UEs or PDUs per network slice to the second NF node. In particular, the first NF node (one of AMF 307, SMF 313, or SMF+PGW-C 315) triggers a request to the NSACF 319 for the determination of the availability of the number of UEs or PDUs per network slice in response to one of the received registration request, the PDU session establishment request, or the PDN connection request. As an example, as per step 2 and step 3 of FIG. 5, the AMF 307 initiates a trigger operation to perform a number of UEs per network slice availability check and update and sends a status signal to the NSACF 319 requesting an update for determination of the number of UEs Slice availability. Similarly, as an example, as per step 2 and step 3 of FIG. 6, the SMF 307 initiates a trigger operation to perform a number of UEs per network slice availability check and update and sends a status signal to the NSACF 319 requesting an update for determination of the number of PDUs per Slice availability. The flow of the method 400 now proceeds to (step 405).

In step 405, the method 400 comprises determining whether there is availability of the number of UEs or PDUs per network slice based on a threshold corresponding to a maximum number of UEs that can register simultaneously or to a maximum number of PDUs that can establish concurrently with the network slice. In particular, the NSACF 319 determines availability of the number of UEs or PDUs per network slice using a threshold value that indicates one of the maximum numbers of UEs that can be registered simultaneously or the maximum number of PDUs that can establish concurrently with the network slice. As an example, in steps 4 and 5 of FIG. 5, the NSACF 319 performs a determination to check the availability of the number of UEs per network slice using the threshold value that indicates one of the maximum numbers of UEs that can be registered simultaneously and thereafter transfers the result of the determination to the AMF 307. In an embodiment of the disclosure, the maximum number of UEs that can be registered simultaneously are UEs that receive Allowed NSSAI including the S-NSSAI during the registration procedure. For example, when the maximum number of UEs for an eMBB slice is 50000, at least one network function in the 5G communication system may transmit Allowed NSSAI including S-NSSAI indicating the eMBB slice to up to 50000 UEs. Similarly, the maximum number of PDUs are PDUs that can establish concurrently with the eMBB slice. The flow of the method 400 now proceeds to (step 407).

In step 407, the method 400 comprises subscribing to the third NF node to request for analytics related to the NSAC of the first NF node. In particular, the first NF node (one of AMF 307, SMF 313, or SMF+PGW-C 315) subscribes to the NWDAF 321 to request for the analytics related to the NSAC of the AMF 307, SMF 313, or SMF+PGW-C 315. The subscription of the request for the analytics is independent of one of an acceptance or rejection of the registration request received by the first NF node, or one of an acceptance or rejection of the PDU session establishment request received by the first NF node. Further, according to some embodiments of the present disclosure, the subscription of the request for the analytics and the determination of whether there is the availability of the number of UEs per network slice may be performed simultaneously. As an example, in step 1 of FIG. 7, the NWDAF 321 receives the request for the analytics from the AMF 307, SMF 313, or SMF+PGW-C 315, and thereafter in response to the received request, the NWDAF 321 periodically collects information related to the NSAC from the first NF node and the second NF node for a specific time duration. For example, as shown in step 2 and step 3 of FIG. 7, the NWDAF 321 subscribes to one of the AMF 307 or the SMF 313 and the NSACF 319 by transmitting one of a Namf/Nsmf/Nnsacf_EventExposure_Subscribe request for the information related to the NSAC, and thereafter at least one of the AMF 307/SMF 313/NSACF 319 may transmit the requested information regarding NSAC to the NWDAF 321.

The collected information includes information regarding at least one of a number of NSAC requests that are received by at least one of the AMF 307/SMF 313/NSACF 319, a number of NSAC requests that are accepted by at least one of the AMF 307/SMF 313/NSACF 319, or a number of NSAC requests that are rejected by at least one of the AMF 307/SMF 313/NSACF 319.

According to some embodiments of the present disclosure, at least one of the AMF 307/SMF 313/NSACF 319 may transmit the information related to the NSAC periodically to the NWDAF 321 using one of the Operations Administration and Maintenance (OAM) configuration or a service-based Interface (SBI). The NWDAF 321 subscribes to one of the AMF 307 or SMF 313 and the NSACF 319 at a particular instance of time or periodically for performing the analytics related to the NSAC. The flow of the method 400 now proceeds to (step 409).

At step 409, the method 400 further comprises receiving a result of the determination from the second NF node and results of the analytics related to the NSAC from the third NF node. In particular, one of the AMF 307, SMF 313, or SMF+PGW-C 315 receives the result of the determination performed by the NSACF 319 in step 405 of the method 400, and also receives results of the analytics related to the NSAC from the NWDAF 321.

The NWDAF 321 performs the analytics related to the NSAC in response to the analytics request received from one of AMF 307, SMF 313, or SMF+PGW-C 315. For performing the analytics related to the NSAC, the NWDAF 321 first analyzes the information related to the NSAC which is collected periodically from the AMF 307, SMF 313, and SMF+PGW-C 315 nodes for a specific time duration. After the collection of the information related to the NSAC, the NWDAF 321 determines one or more levels of congestion periods at AMF 307, SMF 313, or SMF+PGW-C 315 based on the analysis of the collected information. The determined one or more levels of congestion periods include a high level congestion period, a medium level congestion period, and a low level congestion period (For example, one or more levels of congestion periods corresponds to a congestion level including but not limited to High Congestion, Medium Congestion, Low congestion, etc.). Thereafter, the NWDAF

321 transmits the determined one or more levels of congestion period to AMF 307, SMF 313, or SMF+PGW-C 315. As an example, in step 4 of FIG. 7, the NWDAF 321 derives the requested analytics related to the NSAC based on the collected information related to the NSAC, and then in step 5 of FIG. 7, the NWDAF 321 information including the result of the analytics to the AMF 307/SMF 313. The flow of the method 400 now proceeds to (step 411).

At step 411, the method 400 further comprises providing, based on the received result of the determination, a different range of time values of the back-off timer to the one or more UEs using the received results of the analytics. In particular, after receiving the results of the NSAC analytics and the determination, the AMF 307, SMF 313, or SMF+PGW-C 315 provides a different range of the back-off timer values to the UEs 301 while one of rejecting or accepting one of a registration request of the one or more UEs to use the network slice, the PDU session establishment request, or the PDN connection request. As an example, in step 6 of FIG. 5, the AMF 307 provides a different range of the back-off timer values to the UEs 301 while accepting the registration request. Similarly, in step 6 of FIG. 6, the SMF 313 provides a different range of the back-off timer values to the UEs 301 while rejecting the PDU session establishment request.

For providing the different range of time values of the back-off timer to the one or more UEs, at first, at least one of the AMF 307, SMF 313, or SMF+PGW-C 315 selects, for the one or more UEs based on the determined one or more levels of congestion period, a first range of time values of the back-off timer for the high level congestion period, a second range of time values of the back-off timer for the medium level congestion period, and a third range of time values of the backoff timer for the low level congestion period. In particular, the NFs (AMF 307/SMF 313/SMF+PGW-C 315) derive multiple ranges of back-off timer based on the received results of the analytics from the NWDAF 321 and further provide the derived multiple ranges of back-off timer to UEs 301. No same back-off timer value is provided to the UEs 301, so that they can try to connect with the networks at different times for UE registration and PDU session of that slice (for example, range-1 for very high congestion period, range-2 for high congestion period, range-3 for low congestion period). The time values of the back-off timer are selected such that timeouts of the UEs 301 are not synchronized. The first range of time values is different from each of the second range of time values and the third range of time values. The third range of time values is different from the second range of time values. Those skilled in the art will understand that the aforementioned example is exemplary and not limited in scope.

After receiving the back-off timer values provided by the NFs (AMF 307/SMF 313/SMF+PGW-C 315), the UEs 301 can try to connect with the networks at different times for UE registration and PDU session of that slice as shown in step 7 of FIGS. 5 and 6. The same set of steps (step 1 to step 7 of FIGS. 5 and 6 will be executed for each of the received registration requests, PDU session establishment request, or the PDN connection request.

According to some embodiments of the present disclosure, the NFs (AMF 307/SMF 313/SMF+PGW-C 315) may maintain, in a database, history information regarding a number of UE registration requests or PDU session establishment requests that are received at any of the NF nodes (AMF 307/SMF 313/SMF+PGW-C 315) for the network slice per service area. For example, the AMF 307 may be configured to keep the history of the number of requests it receives of UE registration for that slice per service area.

Also, the AMF 307 may keep the data for the number of successes and rejections it receives from the NSACF 319 during a time duration. It may have the implementation specific/configured back-off timer by operator/slice owner for that slice and needed by NWDAF 321. This data may be fetched by NWDAF 321 to create analytics and provide back to the AMF 307.

Similarly, the SMF 313 may be configured to maintain the history of the number of requests it receives of PDU session establishment for that slice per service area. Also, the SMF 313 may be further configured to maintain the data for the number of successes and rejections it receives from the NSACF 319 during a time duration. It may have the implementation specific/configured back-off timer by operator/slice owner for that slice and needed by the NWDAF 321. This data may be fetched by the NWDAF 321 to create analytics and provide back to the SMF 313.

Similarly, the SMF+PGW-C 315 may be configured to maintain the history of the number of requests it receives of PDN connection for that slice per service area. Also, the SMF+PGW-C 315 may be further configured to maintain the data for the number of successes and rejections it receives from the NSACF 319 during a time duration. It may have the implementation specific/configured back-off timer by operator/slice owner for that slice and needed by the NWDAF 321. This data will be fetched by the NWDAF 321 to create analytics and provide back to SMF+PGW-C 315.

According to some embodiments of the present disclosure, the NFs (AMF 307/SMF 313/SMF+PGW-C 315) may maintain, for different time durations in the database, a record of data including the number of UE registration requests that are accepted or rejected by the NSACF 319 and a number of PDU session establishment requests that are accepted or rejected by the NSACF 319.

According to some embodiments of the present disclosure, the operator or slice owner may configure the back-off timer directly in the NSACF 319 by subscribing with the NWDAF 321 or NSAC analytics and after getting analytics from the NWDAF 321. So the NSACF 319 may provide the back-off timers directly to the AMF 307 & the SMF 313 while rejecting the requests or it may use the analytics provided by the NWDAF 321. Alternatively, the AMF 307 & SMF 313 may use this back-off timer provided by the NSACF 319 and use it towards UEs while sending the response.

Figure 8:
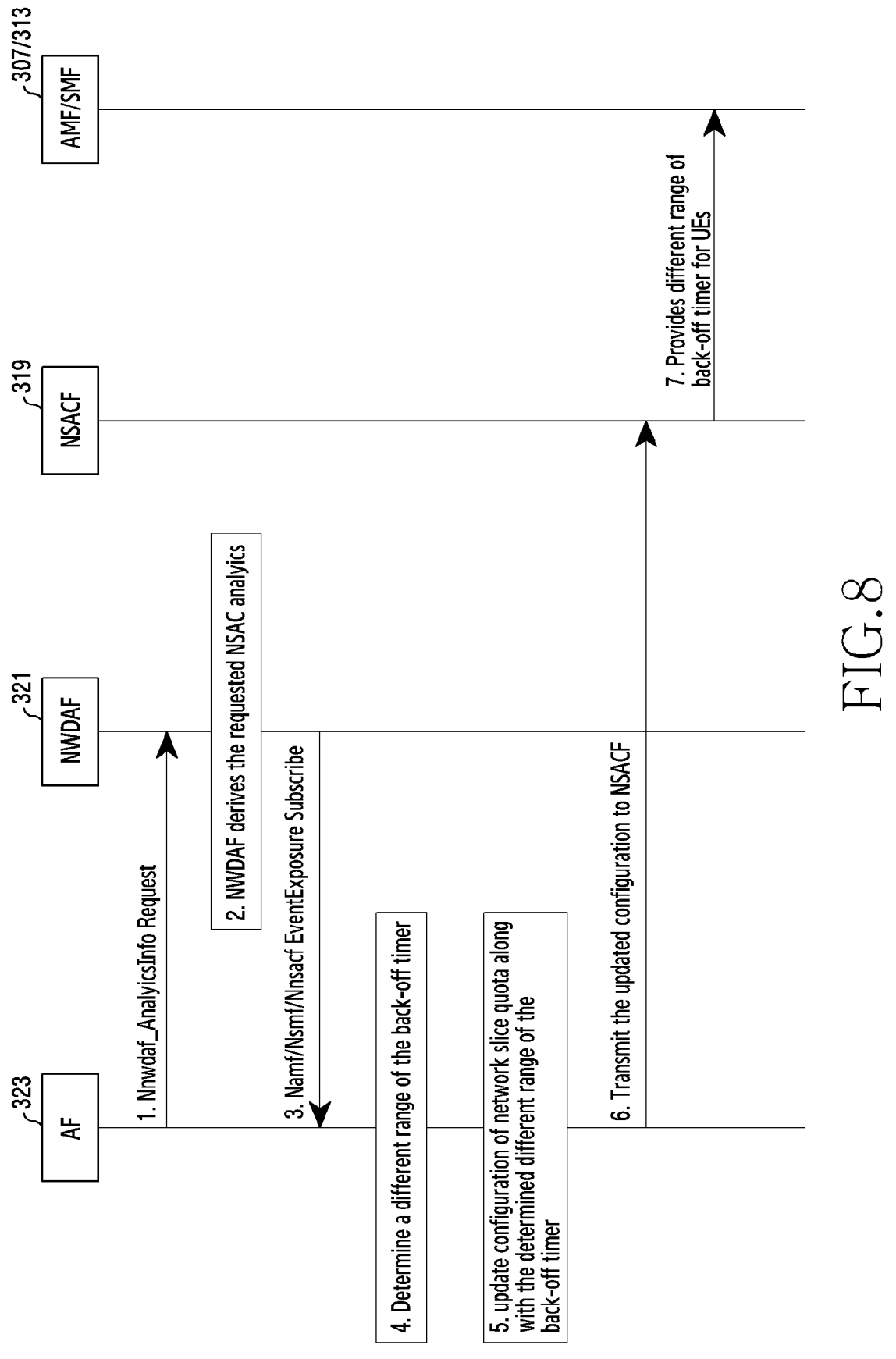
FIG. 8 illustrates a line diagram depicting an exemplary scenario of how AF 323 of FIG. 3 gets NSAC analytics with the help of NWDAF 321 and updating configuration to NSACF 319, in accordance with some embodiments of the present disclosure.

FIG. 8 illustrates a line diagram depicting an exemplary scenario of how AF 323 of FIG. 3 gets NSAC analytics with the help of the NWDAF 321 and updating configuration to the NSACF 319, in accordance with some embodiments of the present disclosure. In accordance with FIG. 8 of the drawings, the NWDAF 321 corresponds to the first NF node, the NSACF 319 corresponds to the second NF node, and an NF among the AMF 307, SMF 313, and PGW-C 315 corresponds to the third NF node without any deviation from the scope of the present disclosure. According to some embodiments, the AF 323 being the slice owner himself can dynamically influence the back-off timer by taking traffic characteristics from the NSACF 319 or the NWDAF 321 and provision the AM and SM policy through NEF.

In step 1 of FIG. 8, the AF 323 subscribes a request to the NWDAF 321 for analytics related to the NSAC. In step 2 of FIG. 8, the NWDAF 321 derives the requested NSAC analytics in the same manner as described above by referring to FIGS. 5 to 7. Thereafter, in step 3 of FIG. 8, the NWDAF 321 transfers information including the results of the analytics to the AF 323 in response to the subscribed request. In step 4 of FIG. 8, the AF 323 determines the different range of the back-off timer for the UEs 301 using the results of the NSAC analytics received from the NWDAF 321. Further, in step 5 of FIG. 8, the AF 323 updates the configuration of the network slice quota along with the determined different range of the back-off timer, and thereafter in step 6 of FIG. 8, transmits the updated configuration to the NSACF 319. After receiving the updated configuration, in step 7 of FIG. 8, the NSACF 319 provides the determined different range of the back-off timer to one of the NF among AMF 307, SMF 313, and PGW-C 315 while rejecting one of the requests received from UEs 301 including the registration request to use the network slice, the PDU session establishment request, or the PDN connection request, respectively or simultaneously.

Figure 9:
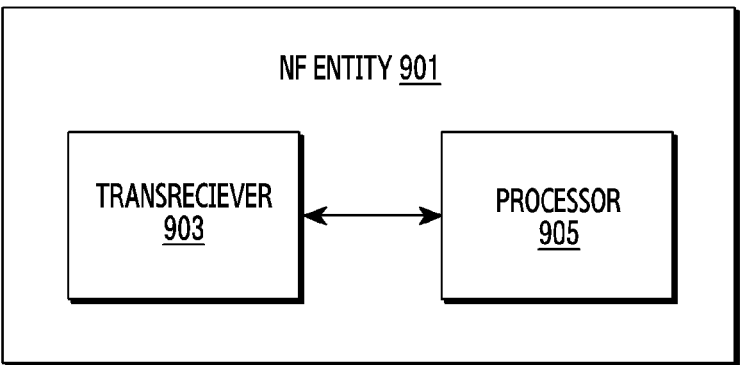
FIG. 9 illustrates a block diagram of an NF entity, in accordance with an embodiment of the present disclosure.

FIG. 9 illustrates a block diagram of an NF entity, in accordance with an embodiment of the present disclosure. FIG. 9 depicts an NF entity 901 that may include a transceiver 903 and a processor 905. The transceiver 903 may operate in a communication method of the NF entity 901 as described above. Elements of the NF entity 901 are not, however, limited thereto. For example, the NF entity 901 may include more (e.g., a memory) or fewer elements than described above. In another example, referring to FIG. 10, the NF entity 901 may include the processor 905 for controlling operations of a plurality of modules.

The transceiver 903 may transmit or receive signals to or from another NF entity, e.g., an AMF. The signal may include control information and data, e.g., a confirmation request message for the availability of a certain slice and a message indicating whether to allow registration of the UE for a certain slice. For signal transmission or reception to or from the other NF entity, the transceiver 903 may include an RF transmitter for up-converting the frequency of a signal to be transmitted and amplifying the signal and an RF receiver for low-noise amplifying a received signal and down-converting the frequency of the received signal. It is merely an example of the transceiver 903, and the elements of the transceiver 903 are not limited to the RF transmitter and RF receiver.

In addition, the transceiver 903 may receive a signal on a wired channel or wireless channel and output the signal to the processor 905 or transmit signal output from the processor 905 on a wired channel or wireless channel. A memory (not shown) may store a program and data required for the operation of the NF entity 901. Furthermore, the memory may store control information or data included in a signal obtained by the NF entity 901. The memory may include a storage medium such as but is not limited to a read-only memory (ROM), a random-access memory (RAM), a hard disk, a compact disc ROM (CD-ROM), and a digital versatile disc (DVD), or a combination of storage mediums.

The processor 905 may control a series of processes for the NF entity 901 to operate in accordance with the embodiments of the present disclosure. The processor 905 may include a controller or one or more processors.

Figure 10:
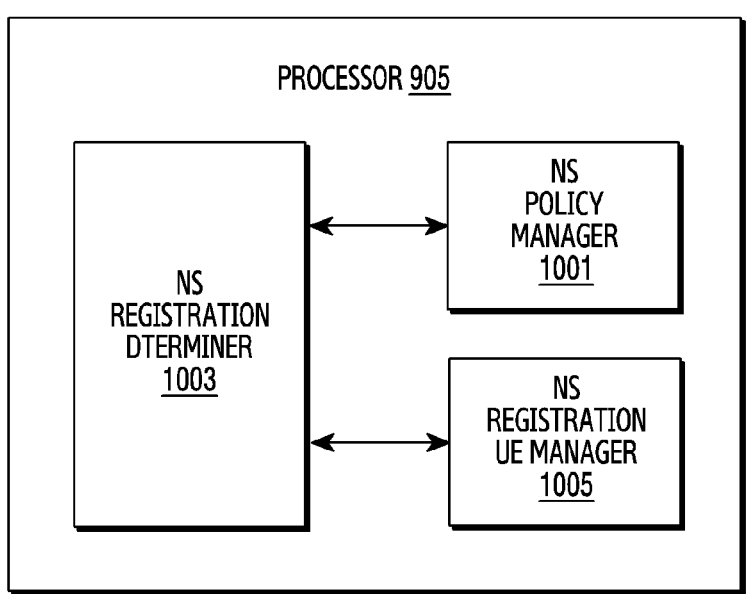
FIG. 10 illustrates a block diagram of a processor of an NF entity, in accordance with an embodiment of the present disclosure.

FIG. 10 illustrates a block diagram of a processor of an NF entity, in accordance with an embodiment of the present disclosure. Referring to FIG. 10, the processor 905 may include a network slice (NS) policy manager 1001, an NS registration determiner 1003, and an NS registration UE manager 1005. Although each 'unit' (or module, device, or ˜er) included in the processor 905 is shown as an independent device form in this embodiment of the disclosure, it is an example and the NS policy manager 1001, the NS registration determiner 1003, and the NS registration UE manager 1005 may be implemented in software. The NS policy manager 1001 may manage information about S-NS-SAI, the maximum number of UEs allowed to be registered with the network slice, and the maximum PDUs establishment request for the network slice. The NS registration UE manager 1005 may update the information of UEs registered with the network slice.

Figure 11:
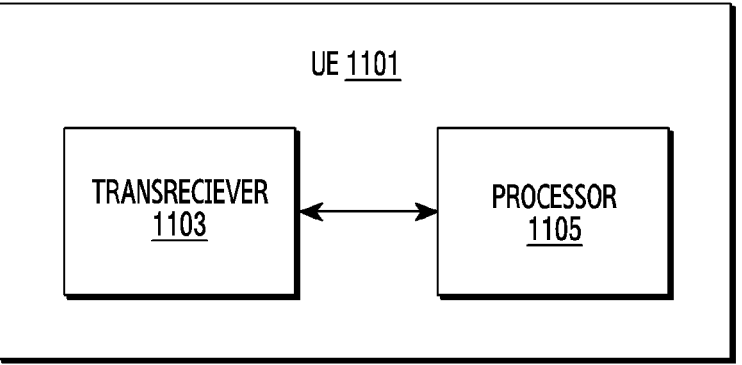
FIG. 11 illustrates a block diagram of a UE, in accordance with an embodiment of the present disclosure.

FIG. 11 illustrates a block diagram of a UE, in accordance with an embodiment of the present disclosure. Referring to FIG. 11, a UE 1101 may include a transceiver 1103 and a processor 1105. The transceiver 1103 may operate in a communication method of the UE 1101 as described above. Elements of terminal 1101 are not, however, limited thereto. For example, the UE 1101 may include more (e.g., a memory) or fewer elements than described above. In another example, referring to FIG. 12, the UE 1101 may include the processor 1105 for controlling operations of a plurality of modules.

The transceiver 1103 may transmit or receive signals to or from another NF entity, e.g., an AMF. For signal transmission or reception to or from the other NF entity, the transceiver 1103 may include an RF transmitter for up-converting the frequency of a signal to be transmitted and amplifying the signal and an RF receiver for low-noise amplifying a received signal and down-converting the frequency of the received signal. It is merely an example of the transceiver 1103, and the elements of the transceiver 1103 are not limited to the RF transmitter and RF receiver.

In addition, the transceiver 1103 may receive a signal on a wired channel or wireless channel and output the signal to the processor 1105 or transmit signal output from the processor 1105 on a wired channel or wireless channel. A memory (not shown) may store a program and data required for the operation of the UE 1101. Furthermore, the memory may store control information or data included in a signal obtained by the UE 1101. The memory may include a storage medium such as but is not limited to a read-only memory (ROM), a random-access memory (RAM), a hard disk, a compact disc ROM (CD-ROM), and a digital versatile disc (DVD), or a combination of storage mediums.

The processor 1105 may control a series of processes for the UE 1101 to operate in accordance with the embodiments of the present disclosure. The processor 1105 may include a controller or one or more processors.

Figure 12:
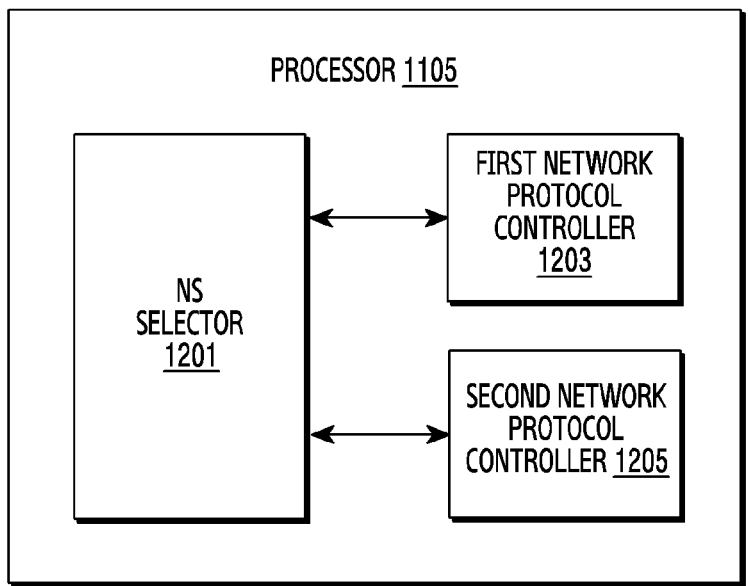
FIG. 12 illustrates a block diagram of a processor of a UE, in accordance with an embodiment of the present disclosure.

FIG. 12 illustrates a block diagram of a processor of a UE, in accordance with an embodiment of the present disclosure. Referring to FIG. 12, the processor 1105 may include an NS selector 1201, a first network protocol controller 1203, and a second network protocol controller 1205. Although each 'unit' (or module, or device) included in the processor 1105 is shown as an independent device form in this embodiment of the disclosure, it is an example and the NS selector 1201, the first network protocol controller 1203, and the second network protocol controller 1205 may be implemented in software.

The NS selector 1201 may select a network slice for which the UE 1101 is going to request for registration, from among a plurality of network slices. The first network protocol controller 1203 may control a series of processes in which the UE 1101 makes access to a base station (or RAN) through the first network (e.g., a 3GPP access network). The UE 1101 may transmit a first registration request for the selected network slice through the first network. The second network protocol controller 1205 may control a series of processes in which the UE 1101 makes access to an N3IWF through a second network (e.g., a non-3GPP access network). The UE 1101 may transmit a third registration request for the selected network slice through a third network.

Figure 13:
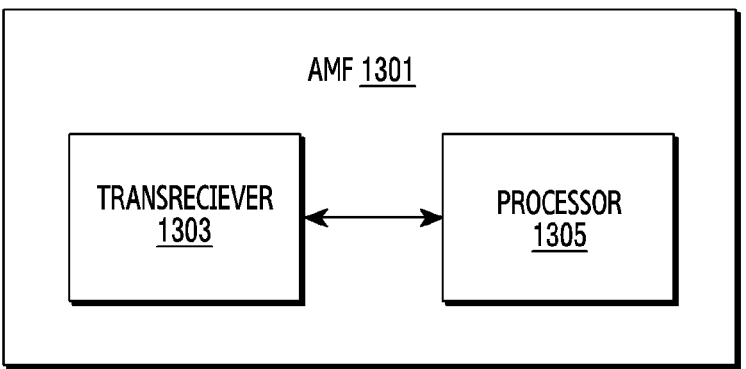
FIG. 13 illustrates a block diagram of an AMF, in accordance with an embodiment of the present disclosure.

FIG. 13 illustrates a block diagram of an AMF, in accordance with an embodiment of the present disclosure. Referring to FIG. 13, an AMF 1301 may include a transceiver 1303 and a processor 1305. The transceiver 1303 may operate in a communication method of the AMF 1301 as described above. Elements of the AMF 1301 are not, however, limited thereto. For example, the AMF 1301 may include more (e.g., a memory) or fewer elements than described above. In another example, referring to FIG. 14, the AMF 1301 may include the processor 1305 for controlling operations of a plurality of modules.

The transceiver 1303 may transmit or receive signals to or from another NF entity. The signal may include control information and data, including e.g., a confirm request message for the availability of a certain slice and a message indicating whether to allow registration of the UE for the certain slice. For signal transmission or reception to or from the other NF entity, the transceiver 1303 may include an RF transmitter for up-converting the frequency of a signal to be transmitted and amplifying the signal and an RF receiver for low-noise amplifying a received signal and down-converting the frequency of the received signal. It is merely an example of the transceiver 1303, and the elements of the transceiver 1303 are not limited to the RF transmitter and RF receiver.

In addition, the transceiver 1303 may receive a signal on a wired channel or wireless channel and output the signal to the processor 1305 or transmit a signal output from the processor 1305 on a wired channel or wireless channel. A memory (not shown) may store a program and data required for the operation of the AMF 1301. Furthermore, the memory may store control information or data included in a signal obtained by the AMF 1301. The memory may include a storage medium such as but is not limited to a read-only memory (ROM), a random-access memory (RAM), a hard disk, a compact disc ROM (CD-ROM), and a digital versatile disc (DVD), or a combination of storage mediums.

The processor 1305 may control a series of processes for the AMF 1301 to operate in accordance with the embodiments of the present disclosure. The processor 1305 may include a controller or one or more processors.

Figure 14:
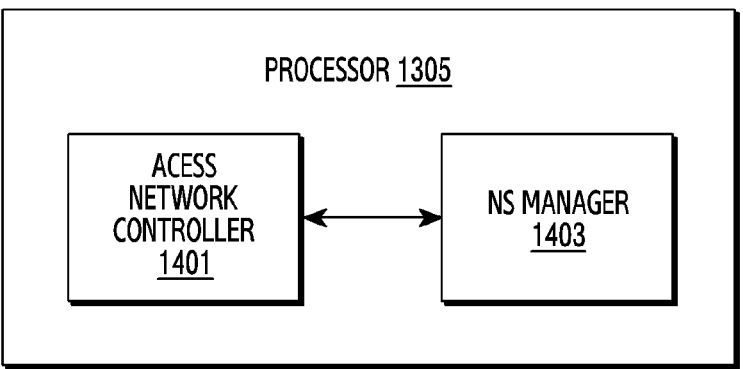
FIG. 14 illustrates a block diagram of a processor of an AMF, in accordance with an embodiment of the present disclosure.

FIG. 14 illustrates a block diagram of a processor of an AMF, in accordance with an embodiment of the present disclosure. Referring to FIG. 14, the processor 1305 may include an access network controller 1401 and an NS manager 1403. Although each 'unit' (or module, or device) included in the processor 1305 is shown as an independent device form in this embodiment of the present disclosure. It is an example and the access network controller 1401 and the NS manager 1403 may be implemented in software.

The access network controller 1401 may control communication with a RAN or N3IWF that receives a registration request for a network slice from a UE, and process signals transmitted to or received from the RAN or N3IWF through the NG2 interface. The NS manager 1403 may determine an allowed slice (Allowed NSSAI) based on the UE's requested slice (Requested NSSAI), UE subscription slice (Subscribed S-NSSAI), the UE access network (3 GPP AN), and/or an operator policy. The NS manager 1403 may check with an NF entity for the availability of a slice.

Figure 15:
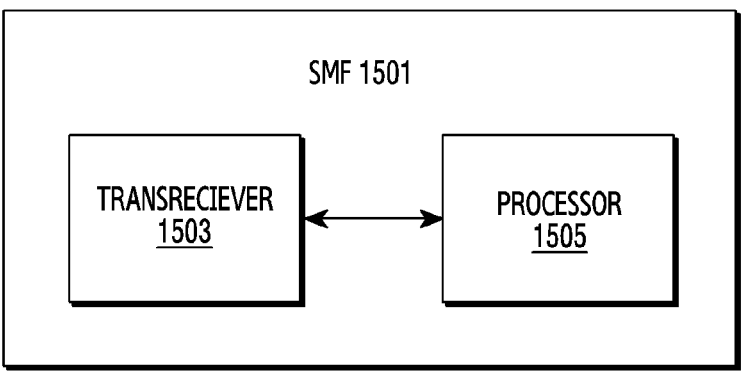
FIG. 15 is a block diagram of an SMF, in accordance with an embodiment of the present disclosure.

FIG. 15 illustrates a block diagram of an SMF, in accordance with an embodiment of the present disclosure. Referring to FIG. 15, an SMF 1501 may include a transceiver 1503 and a processor 1505. The transceiver 1503 may operate in a communication method of the SMF 1501 as described above. Elements of the SMF 1501 are not, however, limited thereto. For example, the SMF 1501 may include more (e.g., a memory) or fewer elements than described above. In another example, referring to FIG. 14, the SMF 1501 may include the processor 1505 for controlling operations of a plurality of modules.

The transceiver 1503 may transmit or receive signals to or from another NF entity. The signal may include control information and data, including e.g., a confirm request message for the availability of a certain slice and a message indicating whether to allow registration of the UE for the certain slice. For signal transmission or reception to or from the other NF entity, the transceiver 1503 may include an RF transmitter for up-converting the frequency of a signal to be transmitted and amplifying the signal and an RF receiver for low-noise amplifying a received signal and down-converting the frequency of the received signal. It is merely an example of the transceiver 1503, and the elements of the transceiver 1503 are not limited to the RF transmitter and RF receiver.

In addition, the transceiver 1503 may receive a signal on a wired channel or wireless channel and output the signal to the processor 1505 or transmit a signal output from the processor 1505 on a wired channel or wireless channel. A memory (not shown) may store a program and data required for the operation of the SMF 1501. Furthermore, the memory may store control information or data included in a signal obtained by the SMF 1501. The memory may include a storage medium such as but is not limited to a read-only memory (ROM), a random-access memory (RAM), a hard disk, a compact disc ROM (CD-ROM), and a digital versatile disc (DVD), or a combination of storage mediums.

The processor 1505 may control a series of processes for the SMF 1501 to operate in accordance with the embodiments of the present disclosure. The processor 1505 may include a controller or one or more processors.

Figure 16:
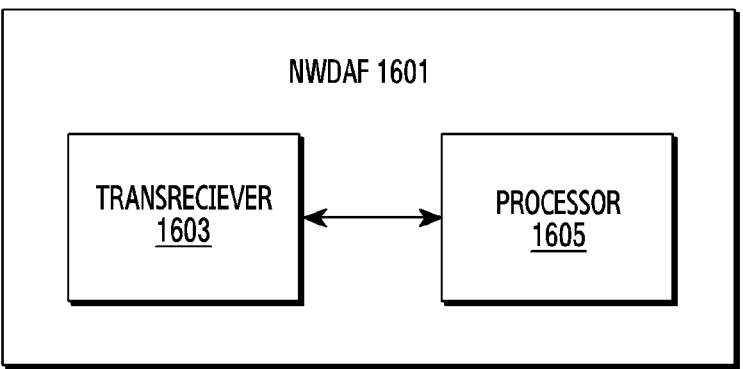
FIG. 16 is a block diagram of an NWADF, in accordance with an embodiment of the present disclosure.

FIG. 16 illustrates a block diagram of an NWDAF, in accordance with an embodiment of the present disclosure. Referring to FIG. 16, an NWDAF 1601 may include a transceiver 1603 and a processor 1605. The transceiver 1603 may operate in a communication method of the NWDAF 1601 as described above. Elements of the NWDAF 1601 are not, however, limited thereto. For example, the NWDAF 1601 may include more (e.g., a memory) or fewer elements than described above. In another example, referring to FIG. 14, the NWDAF 1601 may include the processor 1605 for controlling operations of a plurality of modules.

The transceiver 1603 may transmit or receive signals to or from another NF entity. The signal may include control information and data, including e.g., a confirm request message for the availability of a certain slice and a message indicating whether to allow registration of the UE for the certain slice. For signal transmission or reception to or from the other NF entity, the transceiver 1603 may include an RF transmitter for up-converting the frequency of a signal to be transmitted and amplifying the signal and an RF receiver for low-noise amplifying a received signal and down-converting the frequency of the received signal. It is merely an example of the transceiver 1603, and the elements of the transceiver 1603 are not limited to the RF transmitter and RF receiver.

In addition, the transceiver 1603 may receive a signal on a wired channel or wireless channel and output the signal to the processor 1605 or transmit a signal output from the processor 1605 on a wired channel or wireless channel. A memory (not shown) may store a program and data required for the operation of the NWDAF 1601. Furthermore, the memory may store control information or data included in a signal obtained by the NWDAF 1601. The memory may include a storage medium such as but is not limited to a read-only memory (ROM), a random-access memory (RAM), a hard disk, a compact disc ROM (CD-ROM), and a digital versatile disc (DVD), or a combination of storage mediums.

The processor 1605 may control a series of processes for the NWDAF 1601 to operate in accordance with the embodiments of the present disclosure. The processor 1605 may include a controller or one or more processors.

In an embodiment, a method performed by an access and mobility function (AMF) entity is provided. The method includes receiving, from a user equipment (UE), a registration request including a requested network slice selection assistance information (NSSAI); transmitting, to a Network Slice Admission Control Function (NSACF) entity, a request for determination of an availability of a number of UEs based on the registration request; and in case that a rejection for the request is received from the NSACF, transmitting, to the UE, information on a back-off timer.

The information on the back-off timer may include a value for the back-off timer, and the value for the back-off timer may be selected such that timeouts of one or more UEs are not synchronized.

The method may further include transmitting, a network data analytics function (NWDAF) entity, a request for analytics related to a network slice admission control (NSAC) of the AMF entity; and receiving, from the NWDAF entity, the analytics related to the NSAC of the AMF entity.

The information on the back-off timer may be determined based on the received analytics.

The received analytics may include one or more levels of congestion periods of a high level congestion period, a medium level congestion period, and a low level congestion period, and the information on the back-off timer may be determined by: selecting a first range of time values of the back-off timer for the high level congestion period, a second range of time values of the back-off timer for the medium level congestion period, and a third range of time values of the backoff timer for the low level congestion period. The first range of time values may be different from each of the second range of time values and the third range of time values, and the third range of time values may be different from the second range of time values.

The rejection may be determined based on the availability of the number of UEs and a threshold corresponding to a maximum number of UEs that can register simultaneously.

In an embodiment, a method performed by a session management function (SMF) entity is provided. The method includes: receiving, from a user equipment (UE), a registration request including a protocol data unit (PDU) session establishment request including a single NSSAI (S-NSSAI); transmitting, to a Network Slice Admission Control Function (NSACF) entity, a request for an availability of a number of protocol data unit (PDU)s per a network slice based on the registration request based on the received registration request; and in case that a rejection for the request is received from the NSACF, transmitting, to the UE, information on a back-off timer.

The information on the back-off timer may include a value for the back-off timer, and the value for the back-off timer may be selected such that timeouts of one or more UEs are not synchronized.

The method may further include: transmitting, to the NSACF entity, a request for analytics related to a network slice admission control (NSAC) of the SMF entity; and receiving, from the NSACF entity, the analytics related to the NSAC of the SMF entity.

The information on the back-off timer may be determined based on the received analytics.

The received analytics may include one or more levels of congestion periods of a high level congestion period, a medium level congestion period, and a low level congestion period, and the information on the back-off timer may be determined by: selecting a first range of time values of the back-off timer for the high level congestion period, a second range of time values of the back-off timer for the medium level congestion period, and a third range of time values of the backoff timer for the low level congestion period. The first range of time values may be different from each of the second range of time values and the third range of time values, and the third range of time values may be different from the second range of time values.

The rejection may be determined based on the availability of the number of PDUs and a threshold corresponding to a maximum number of PDUs that can establish concurrently with the network slice.

In an embodiment, a method performed by a network data analytics function (NWDAF) entity is provided. The method includes: receiving, from an access and mobility function (AMF) entity or a session management function (SMF) entity, a request for analytics related to a network slice admission control (NSAC) of the AMF entity or the SMF entity; collecting information related to the NSAC of the AMF entity or the SMF entity based on the received request for a time duration; generating the analytics related to the NSAC of the AMF entity or the SMF entity based on the collected information; and transmitting, to the AMF entity or the SMF entity, the analytics related to the NSAC of the AMF entity or the SMF entity.

The information may be related to the NSAC via one of Operations Administration and Maintenance (OAM) configuration or a service based Interface (SBI).

The collecting information may include: transmitting, to at least one of one or more AMF entity, one or more SMF entity, one or more a Network Slice Admission Control Function (NSACF) entity, a subscription request of the information; and receiving, from the at least one of the one or more AMF entity, the one or more SMF entity, the one or more a Network Slice Admission Control Function (NSACF) entity, the information at an instance of time or periodically.

The generating the analytics related to the NSAC of the AMF entity or the SMF entity may include: analyzing the collected information related to the NSAC; and determining, one or more levels of congestion periods at the first NF node based on the analysis of the collected information. The determined one or more levels of congestion periods may include a high level congestion period, a medium level congestion period, and a low level congestion period.

In an embodiment, an access and mobility function (AMF) entity is provided. The AMF entity includes: a transceiver; and a processor coupled to the transceiver, the processor configured to: receive, from a user equipment (UE), a registration request including a requested network slice selection assistance information (NSSAI); transmit, to a Network Slice Admission Control Function (NSACF) entity, a request for determination of an availability of a number of UEs based on the registration request; and in case that a rejection for the request is received from the NSACF, transmit, to the UE, information on a back-off timer.

In an embodiment, a session management function (SMF) entity is provided. The SMF entity includes: a transceiver; and a processor coupled to the transceiver, the processor configured to: receive, from a user equipment (UE), a registration request including a protocol data unit (PDU) session establishment request including a single NSSAI (S-NSSAI); transmit, to a Network Slice Admission Control Function (NSACF) entity, a request for an availability of a number of protocol data unit (PDU)s per a network slice based on the registration request based on the received registration request; and in case that a rejection for the request is received from the NSACF, transmit, to the UE, information on a back-off timer.

In an embodiment, a network data analytics function (NWDAF) entity is provided. The NWDAF entity includes: a transceiver; and a processor coupled to the transceiver, the processor configured to: receive, from an access and mobility function (AMF) entity or a session management function (SMF) entity, a request for analytics related to a network slice admission control (NSAC) of the AMF entity or the SMF entity; collect information related to the NSAC of the AMF entity or the SMF entity based on the received request for a time duration; generate the analytics related to the NSAC of the AMF entity or the SMF entity based on the collected information; and transmit, to the AMF entity or the SMF entity, the analytics related to the NSAC of the AMF entity or the SMF entity.

In an embodiment, a method for providing a back-off timer to one or more User Equipment's (UEs) is provided. The method includes: receiving, by a first Network Function (NF) node from the one or more UEs, one of a registration request to use a network slice of the first NF node, a protocol data unit (PDU) session establishment request with a single network slice selection assistance information (S-NSSAI), or a packet data network (PDN) connection request; triggering, by the first NF node based on one of the received registration request, the PDU session establishment request, or the PDN connection request, a request for determination of an availability of a number of UEs or PDUs per network slice to a second NF node; subscribing, by the first NF node to a third NF node, a request for analytics related to a network slice admission control (NSAC) of the first NF node; receiving, by the first NF node, a result of the determination of the availability of the number of UEs or PDUs per network slice from the second NF node and results of the analytics related to the NSAC from the third NF node; and providing, by the first NF node based on the result of the determination, a range of time values of a back-off timer to the one or more UEs using the received results of the analytics.

The results of the analytics may related to the NSAC are received in response to the subscribed request, the subscription of the request for the analytics may be independent of one of an acceptance or rejection of the received registration request, or one of an acceptance or rejection the received PDU session establishment request, and the subscription of the request for the analytics and the determination of whether there is the availability of the number of UEs per network slice may be performed simultaneously.

The method may further include: receiving, by the third NF node, the request transmitted by the first NF node; and periodically collecting, by the third NF node based on the received request, information related to the NSAC from the first NF node and the second NF node for a specific time duration.

The method may further include: periodically collecting, by the third NF node from the first NF node and the second NF node, the information related to the NSAC via one of Operations Administration and Maintenance (OAM) configuration or a service based Interface (SBI), wherein one of the first NF node or the second NF node is subscribed by the third NF node at a particular instance of time or periodically for performing the analytics related to the NSAC.

The method may further include: analyzing, by the third NF node, the collected information related to the NSAC; determining, by the third NF node, one or more levels of congestion periods at the first NF node based on the analysis of the collected information, wherein the determined one or more levels of congestion periods include a high level congestion period, a medium level congestion period, and a low level congestion period; and transmitting, by the third NF node, the determined one or more levels of congestion period to the first NF node.

The method may further include: selecting, by the first NF node for the one or more UEs based on the determined one or more levels of congestion period, a first range of time values of the back-off timer for the high level congestion period, a second range of time values of the back-off timer for the medium level congestion period, and a third range of time values of the backoff timer for the low level congestion period. The first range of time values may be different from each of the second range of time values and the third range of time values, and the third range of time values may be different from the second range of time values.

The collected information may include information regarding at least one of a number of NSAC requests that are received at the first NF node, a number of NSAC requests that are accepted by the first NF node, or a number of NSAC requests that are rejected by the first NF node.

The method may further include: maintaining, by the first NF node in a database, history information regarding a number of UE registration requests or PDU session establishment requests that are received at the first NF node for the network slice per service area.

The method may further include: maintaining, by the first NF node for different time durations in a database, a record of data including a number of UE registration requests that are accepted or rejected by the second NF node and a number of PDU session establishment requests that are accepted or rejected by the second NF node.

The method may further include: receiving, by the second NF node, the request for determination of the availability of the number of UEs or PDUs per network slice; and determining, by the second NF node in response to the received request for determination, whether there is availability of the number of UEs or PDUs per network slice based on a threshold corresponding to a maximum number of UEs that can register simultaneously or to a maximum number of PDUs that can establish concurrently with the network slice.

The time values of the back-off timer may be selected such that timeouts of the one or more UEs are not synchronized.

The first NF node may be an access and mobility function (AMF) entity in a case when the registration request to use the network slice is received.

The first NF node may be a session management function (SMF) entity in a case when the PDU session establishment request with the S-NSSAI is received.

The first NF node may be a combination of a session management function (SMF) entity and a PDN gateway (PGW-C) entity in a case when the PDN connection request is received.

The second NF node may be a Network Slice Admission Control Function (NSACF) entity, and the third NF node may be a network data analytics function (NWDAF) entity.

In an embodiment, a system for providing a back-off timer to one or more User Equipment's (UEs) is provided. The system includes: a plurality of network nodes including a first Network Function (NF) node, a second NF node, and a third NF node. The first NF node may be configured to: receive one of a registration request to use a network slice of the first NF node, a protocol data unit (PDU) session establishment request with a single network slice selection assistance information (S-NSSAI), or a packet data network (PDN) connection request; trigger, based on one of the received registration request, the PDU session establishment request, or the PDN connection request, a request for determination of an availability of a number of UEs or PDUs per network slice to the second NF node, wherein the second NF node is configured to determine whether there is availability of the number of UEs or PDUs per network slice based on a threshold corresponding to a maximum number of UEs that can register simultaneously with the network slice or to a maximum number of concurrent PDUs that can establish with the network; subscribe, to a third NF node, a request for analytics related to a network slice admission control (NSAC) of the first NF node; receive a result of the determination from the second NF node and results of the analytics related to the NSAC from the third NF node; and provide, based on a result of the determination, a different range of time values of a back-off timer to the one or more UEs using the received results of the analytics.

In an embodiment, a system for providing a back-off timer to one or more User Equipment's (UEs) is provided The system includes: a plurality of network nodes including an AF node, a first NF node, a second NF node, and a third NF node. The AF node is configured to: subscribe a request to the first NF node for analytics related to a network slice admission control (NSAC); receive results of the analytics from the first NF node in response to the subscribed request; determine a different range of the back-off timer for the one or more UEs using the received results of the analytics; update configuration of a network slice quota along with the determined different range of the back-off timer; and transmit the updated configuration to the second NF node, wherein the second NF node provides the determined different range of the back-off timer to the third NF node while rejecting one of a registration request of the one or more UEs to use a network slice, a PDU session establishment request, or a packet data network (PDN) connection request.

The first NF node may be a network data analytics function (NWDAF) entity, and the second NF node may be a Network Slice Admission Control Function (NSACF) entity.

The third NF node may be one of an access and mobility function (AMF) entity, a session management function (SMF) entity, or a combination of a session management function (SMF) entity and a PDN gateway (PGW-C) entity.

In a firmware or software configuration, the method and the communication according to the embodiments of the present disclosure may be implemented in the form of modules, procedures, functions, etc. performing the above-described functions or operations. Instructions may be stored in a memory unit and executed by a processor. The memory unit may be located at the interior or exterior of the processor and may transmit and receive data to and from the processor via various known means.

These programs (software modules or software) may be stored in random access memories (RAMs), non-volatile memories including flash memories, read only memories (ROMs), electrically erasable programmable ROMs (EE-PROMs), magnetic disc storage devices, compact disc-ROMs (CD-ROMs), digital versatile discs (DVDs), other types of optical storage devices, or magnetic cassettes. Alternatively, the programs may be stored in a memory configured by a combination of some or all of such storage devices. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured by any combination thereof. Such a storage device may be connected through an external port to an apparatus performing an embodiment of the disclosure. Also, a separate storage device on a communication network may be connected to an apparatus performing an embodiment of the disclosure.

In the above particular embodiments of the disclosure, the components included in the disclosure are expressed in the singular or plural according to the presented particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

Those skilled in the art will appreciate that the operations described herein in the present disclosure may be carried out in other specific ways than those set forth herein without departing from essential characteristics of the present disclosure. The above-described embodiments are therefore to be construed in all aspects as illustrative and not restrictive. The scope of the disclosure should be determined by the appended claims, not by the above description, and all changes coming within the meaning of the appended claims are intended to be embraced therein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Although the present disclosure has been described with various embodiments, various changes and modifications may be suggested to one skilled in the art. It is intended that the present disclosure encompass such changes and modifications as fall within the scope of the appended claims.

What we claim is:

1. A method performed by an access and mobility function (AMF) entity, the method comprising:

receiving, from a user equipment (UE), a registration request including a requested network slice selection assistance information (NSSAI);

transmitting, to a Network Slice Admission Control Function (NSACF) entity, a request for determination of an availability of a number of UEs based on the registration request;

transmitting, to a network data analytics function (NWDAF) entity, a request for analytics related to a network slice admission control (NSAC) of the AMF entity;

receiving, from the NWDAF entity, the analytics related to the NSAC of the AMF entity; and receiving a response for the registration request from the NSACF with a rejection cause set to maximum number of UEs per network slice reached, transmitting, to the UE, information on a back-off timer, wherein a time value for the back-off timer is selected such that timeouts of one or more UEs are not synchronized based on the received analytics, wherein the received analytics includes one or more levels of congestion periods of a high level congestion period, a medium level congestion period, and a low level congestion period, and wherein the information on the back-off timer is determined by:

selecting a first range of time values of the back-off timer for the high level congestion period, a second range of time values of the back-off timer for the medium level congestion period, and a third range of time values of the back-off timer for the low level congestion period.

2. The method of claim 1, wherein the information on the back-off timer includes the time value for the back-off timer.

3. The method of claim 1, wherein, the first range of time values is different from each of the second range of time values and the third range of time values, and the third range of time values is different from the second range of time values.

4. The method of claim 1, wherein the rejection is determined based on the availability of the number of UEs and a threshold corresponding to a maximum number of UEs that can register simultaneously.

5. An access and mobility function (AMF) entity comprising:

a transceiver; and a processor coupled to the transceiver, the processor configured to:

receive, from a user equipment (UE), a registration request including a requested network slice selection assistance information (NSSAI);

transmit, to a Network Slice Admission Control Function (NSACF) entity, a request for determination of an availability of a number of UEs based on the registration request;

transmit, to a network data analytics function (NWDAF) entity, a request for analytics related to a network slice admission control (NSAC) of the AMF entity;

receive, from the NWDAF entity, the analytics related to the NSAC of the AMF entity; and receive a response for the request from the NSACF, transmit, to the UE, information on a back-off timer, wherein a time value for the back-off timer is selected such that timeouts of one or more UEs are not synchronized based on the received analytics, wherein the received analytics includes one or more levels of congestion periods of a high level congestion period, a medium level congestion period, and a low level congestion period, and wherein the information on the back-off timer is determined by:

selecting a first range of time values of the back-off timer for the high level congestion period, a second range of time values of the back-off timer for the medium level congestion period, and a third range of time values of the back-off timer for the low level congestion period.

6. The AMF entity of claim 5, wherein the information on the back-off timer includes the time value for the back-off timer.

7. The AMF entity of claim 5, wherein, the first range of time values is different from each of the second range of time values and the third range of time values, and the third range of time values is different from the second range of time values.

8. The AMF entity of claim 5, wherein the rejection is determined based on the availability of the number of UEs and a threshold corresponding to a maximum number of UEs that can register simultaneously.

\* \* \* \* \*